(12) United States Patent
Cho et al.

(10) Patent No.: US 11,072,347 B2
(45) Date of Patent: Jul. 27, 2021

(54) VEHICLE CONTROL DEVICE PROVIDED IN VEHICLE AND METHOD FOR CONTROLLING VEHICLE

(71) Applicant: LG ELECTRONICS INC., Seoul (KR)

(72) Inventors: Jaehoon Cho, Seoul (KR); Kangmin Kim, Seoul (KR); Doyun Park, Seoul (KR); Heejeong Heo, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 420 days.

(21) Appl. No.: 16/116,220

(22) Filed: Aug. 29, 2018

(65) Prior Publication Data
US 2019/0185019 A1 Jun. 20, 2019

(30) Foreign Application Priority Data
Dec. 15, 2017 (KR) .......... 10-2017-0173435

(51) Int. Cl.
*B60W 50/00* (2006.01)
*B60W 50/14* (2020.01)
(52) U.S. Cl.
CPC ........ *B60W 50/14* (2013.01); *B60W 50/0098* (2013.01); *B60W 2050/146* (2013.01); *B60W 2420/42* (2013.01); *B60W 2540/215* (2020.02); *B60W 2540/26* (2013.01); *B60W 2554/00* (2020.02)
(58) Field of Classification Search
None
See application file for complete search history.

(56) References Cited

U.S. PATENT DOCUMENTS

| 10,580,296 B2 * | 3/2020 | Pedersen .......... G08G 1/096791 |
| 2014/0121903 A1 * | 5/2014 | Lee .......... B60K 37/06 701/41 |
| 2019/0304309 A1 * | 10/2019 | Sakamoto .......... B60W 50/14 |
| 2020/0342756 A1 * | 10/2020 | MacKenzie .......... G08G 1/16 |

FOREIGN PATENT DOCUMENTS

| JP | 2008-84141 A | 4/2008 |
| KR | 10-2010-0037368 A | 4/2010 |
| KR | 10-2012-0119537 A | 10/2012 |

\* cited by examiner

*Primary Examiner* — James M McPherson
(74) *Attorney, Agent, or Firm* — Birch, Stewart, Kolasch & Birch, LLP

(57) ABSTRACT

A vehicle control device including a detecting unit configured to detect an external situation of a vehicle and an internal situation of the vehicle; an output unit; and a processor configured to in response to the detected external situation of the vehicle corresponding to a first external event, and the detected internal situation of the vehicle corresponding to a first internal event, control the output unit to output first guidance information related to the detected external event, and in response to the detected external situation of the vehicle corresponding to the first external event, and the detected internal situation of the vehicle corresponding to a second internal event different than the first internal event, control the output unit to output second guidance information related to the detected external event that is different than the first guidance information.

20 Claims, 15 Drawing Sheets

(a)

(b)

(a)

A 100km/h 40°
B 90km/h 65°
C 40km/h 100°

(b)

VEHICLE CONTROL DEVICE PROVIDED IN VEHICLE AND METHOD FOR CONTROLLING VEHICLE

CROSS-REFERENCE TO RELATED APPLICATION

Pursuant to 35 U.S.C. § 119(a), this application claims the benefit of earlier filing date and right of priority to Korean Application No. 10-2017-0173435 filed in the Republic of Korea on Dec. 15, 2017, the contents of which is incorporated by reference herein in its entirety.

BACKGROUND OF THE INVENTION

1. Field of the Invention

The present disclosure relates to a vehicle control device provided in a vehicle and a method for controlling a vehicle.

2. Background of the Invention

Vehicles are devices which a user can get on to move in a desired direction. Typical examples are automobiles. For convenience of users who use vehicles, various sensors and electronic devices are provided. In particular, for user convenience, research on an advanced driver assistance system (ADAS) has been actively performed. Furthermore, development of autonomous vehicles has actively been made.

A vehicle may include various types of lamps. Generally, a vehicle includes a variety of vehicle lamps having a lighting function for allowing an object located near the vehicle to be easily recognized when driving at night, and a signal function for notifying other vehicles or other road users about a driving state of the own vehicle. For example, the vehicle may have a device which directly emits light using a lamp, such as a headlamp that irradiates light to a front side of the vehicle to secure a driver's field of view, a brake light which is turned on when a brake is stepped on, or a turn signal used when turning right or left.

In another example, a reflector, or the like, for reflecting light so that the vehicle can be easily recognized on the outside is mounted on the front and rear of the vehicle. These vehicle lamps are stipulated by laws and regulations for their installation standards and specifications so that each function can be sufficiently utilized. Recently, as the ADAS has been actively developed, there is a need to develop a technology that maximizes user convenience and safety in vehicle operation.

SUMMARY OF THE INVENTION

Therefore, an aspect of the detailed description is to provide a vehicle control device and a vehicle control method capable of performing guidance related to an external event that occurs outside a vehicle in an optimized manner.

Another aspect of the present invention is to provide a vehicle control device and a vehicle control method capable of outputting optimized guidance information related to an external event according to the internal situation of a vehicle.

Another aspect of the present invention is to provide a vehicle control device and a vehicle control method capable of controlling a vehicle in an optimized manner according to an external event that occurs outside the vehicle.

The problems of the present invention are not limited to the above-mentioned problems, and other problems not mentioned may be clearly understood by those skilled in the art from the following description.

To achieve these and other advantages and in accordance with the purpose of this specification, as embodied and broadly described herein, a vehicle control device includes: a communication unit; a sensing unit sensing at least one of an external situation of a vehicle and an internal situation of the vehicle; an output unit; and a processor detecting an external event that occurs outside of the vehicle through the communication unit or the sensing unit, detecting the internal situation of the vehicle through the sensing unit, and outputting different guidance information related to the detected external event through the output unit based on the detected internal situation of the vehicle.

A vehicle according to an embodiment of the present disclosure may include the vehicle control device described in this disclosure.

To achieve these and other advantages and in accordance with the purpose of this specification, as embodied and broadly described herein, a method for controlling a vehicle includes: detecting an external event which occurs outside of a vehicle; detecting an internal situation of the vehicle; and outputting different guidance information related to the detected external event based on the detected internal situation of the vehicle.

According to the embodiment of the present invention, one or more advantages can be obtained as follows.

First, in the present invention, by outputting different guidance information according to the internal state of the vehicle with respect to the same external event, a novel user interface capable of intuitively informing about an action to be taken by the user, rather than simply informing about an external event, can be provided.

Second, in the present invention, by performing preset vehicle controlling according to internal situations of the vehicle with respect to an external event, a novel vehicle control method capable of preventing an action that may cause user inconvenience even when a running state of the vehicle is changed due to the external event can be provided.

The effects of the present invention are not limited to the effects mentioned above, and other effects not mentioned can be clearly understood by those skilled in the art from the description of the claims.

Further scope of applicability of the present application will become more apparent from the detailed description given hereinafter. However, it should be understood that the detailed description and specific examples, while indicating preferred embodiments of the invention, are given by way of illustration only, since various changes and modifications within the scope of the invention will become apparent to those skilled in the art from the detailed description.

BRIEF DESCRIPTION OF THE DRAWINGS

The accompanying drawings, which are included to provide a further understanding of the invention and are incorporated in and constitute a part of this specification, illustrate exemplary embodiments and together with the description serve to explain the principles of the invention.

In the drawings.

DETAILED DESCRIPTION OF THE INVENTION

Figure 1:
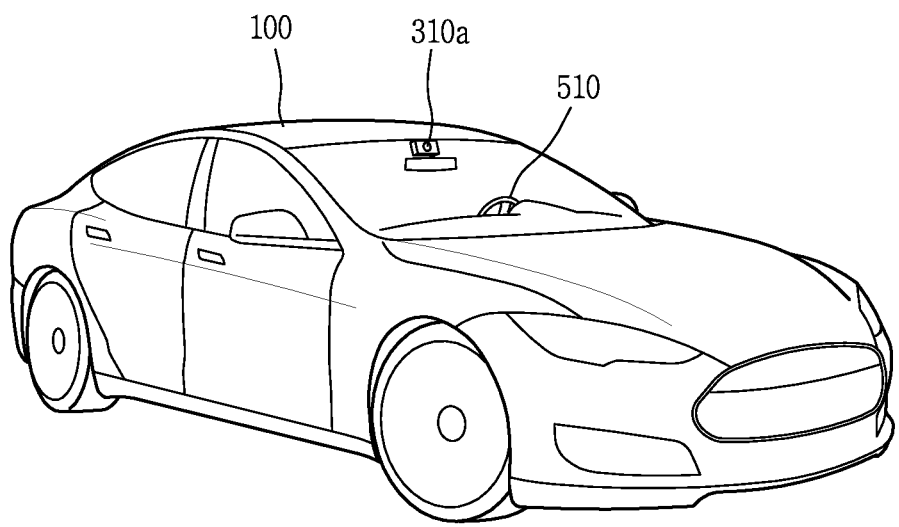
FIG. 1 is a view illustrating an appearance of a vehicle according to an embodiment of the present disclosure.
Figure 1:
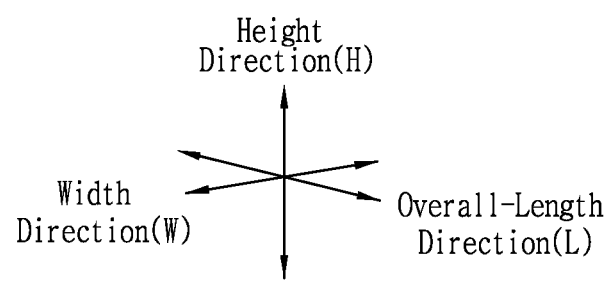
Figure 2:
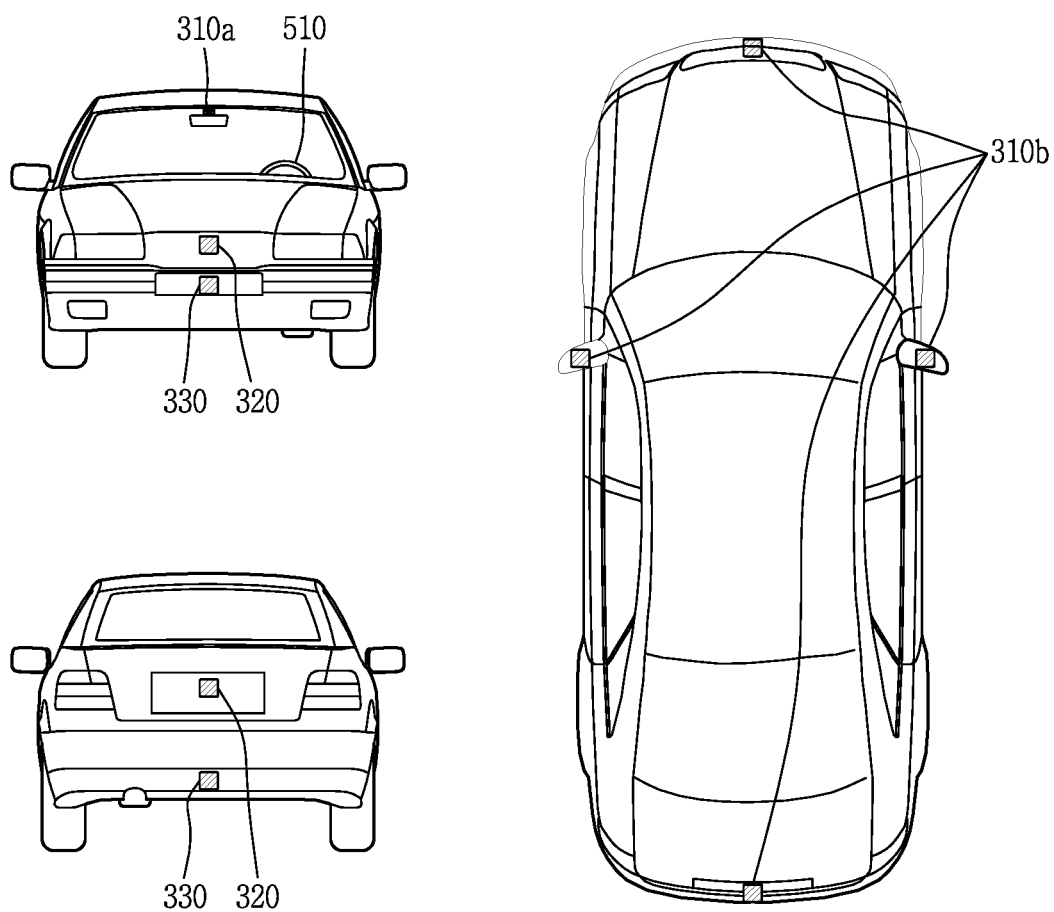
FIG. 2 is a view illustrating a vehicle according to an embodiment of the present disclosure viewed at various angles.
Figure 3:
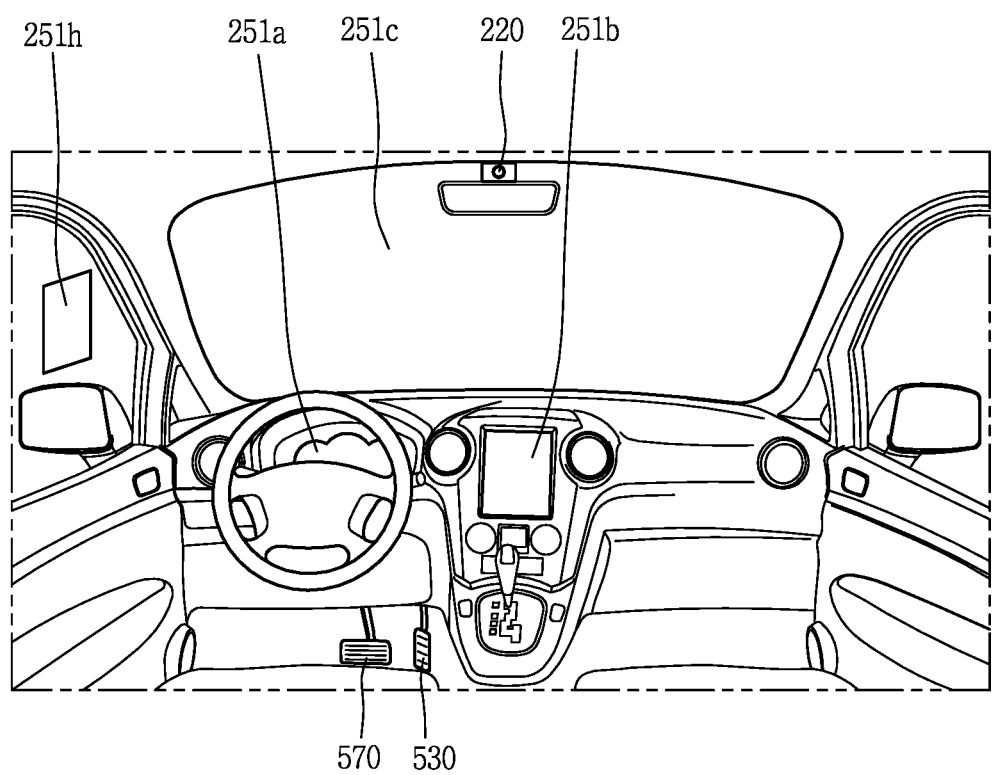
FIGS. 3 and 4 are views illustrating the inside of a vehicle according to an embodiment of the present disclosure.
Figure 4:
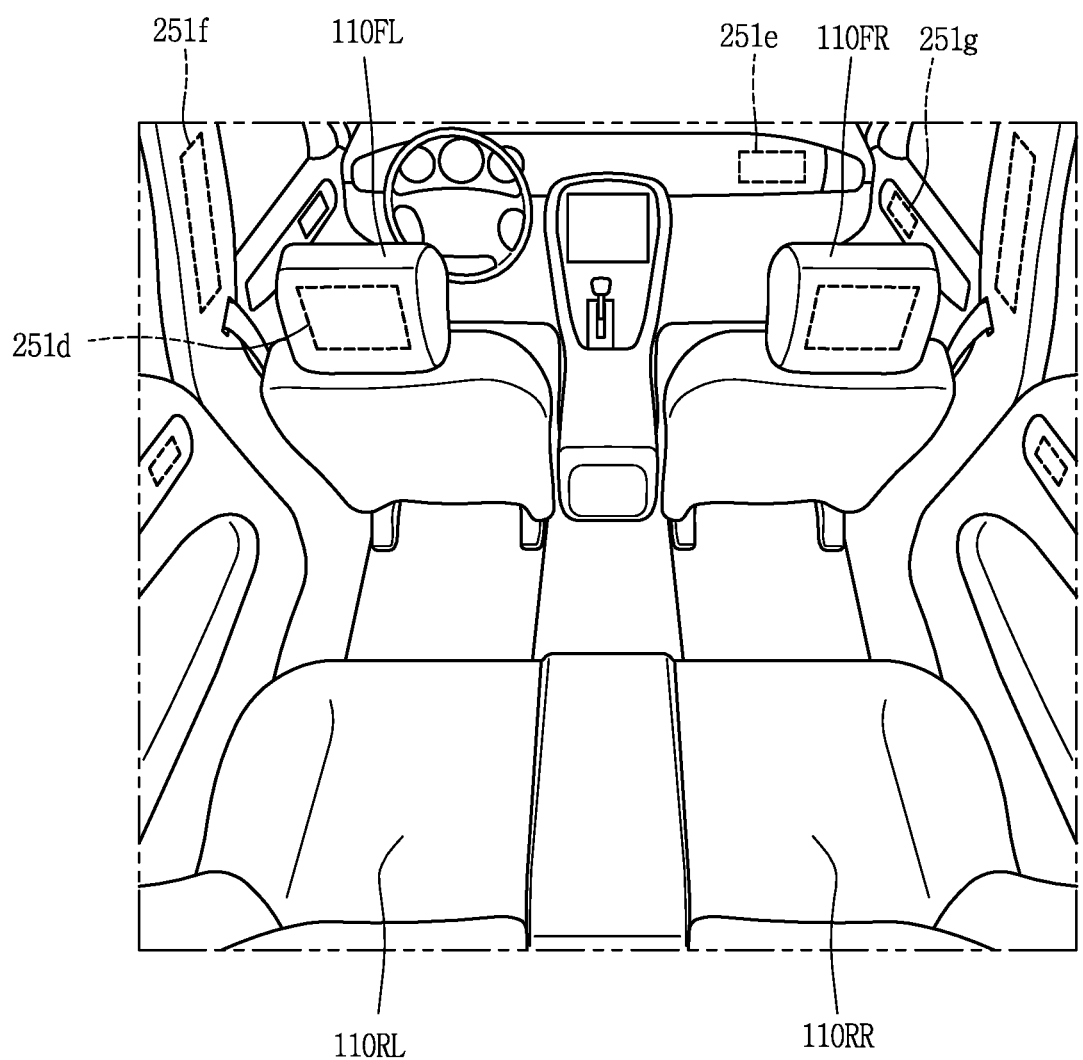

Description will now be given in detail according to exemplary embodiments disclosed herein, with reference to the accompanying drawings. For the sake of brief description with reference to the drawings, the same or equivalent components may be provided with the same or similar reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

Although the terms first, second, etc. may be used herein to describe various elements, these elements should not be limited by these terms. These terms are generally only used to distinguish one element from another. When an element is referred to as being "connected with" another element, the element can be connected with the other element or intervening elements may also be present. In contrast, when an element is referred to as being "directly connected with" another element, there are no intervening elements present.

A singular representation may include a plural representation unless it represents a definitely different meaning from the context. Terms such as "include" or "has" are used herein and should be understood that they are intended to indicate an existence of several components, functions or steps, disclosed in the specification, and it is also understood that greater or fewer components, functions, or steps may likewise be utilized.

A vehicle according to an embodiment of the present invention can be understood as a conception including cars, motorcycles and the like. Hereinafter, the vehicle will be described based on a car. The vehicle according to the embodiment of the present invention can be a conception including all of an internal combustion engine car having an engine as a power source, a hybrid vehicle having an engine and an electric motor as power sources, an electric vehicle having an electric motor as a power source, and the like. In the following description, a left side of a vehicle refers to a left side in a driving direction of the vehicle, and a right side of the vehicle refers to a right side in the driving direction.

As illustrated in FIGS. 1 to 7, a vehicle 100 includes wheels turning by a driving force, and a steering apparatus 510 for adjusting a driving (ongoing, moving) direction of the vehicle 100. The vehicle 100 can be an autonomous vehicle.

The vehicle 100 can be switched into an autonomous mode or a manual mode based on a user input. For example, the vehicle can be converted from the manual mode into the autonomous mode or from the autonomous mode into the manual mode based on a user input received through a user interface apparatus 200.

The vehicle 100 can also be switched into the autonomous mode or the manual mode based on driving environment information. The driving environment information can be generated based on object information provided from an object detecting apparatus 300. For example, the vehicle 100 can be switched from the manual mode into the autonomous mode or from the autonomous module into the manual mode based on driving environment information generated in the object detecting apparatus 300.

In an example, the vehicle 100 can be switched from the manual mode into the autonomous mode or from the autonomous module into the manual mode based on driving environment information received through a communication apparatus 400. The vehicle 100 can also be switched from the manual mode into the autonomous mode or from the autonomous module into the manual mode based on information, data or signal provided from an external device.

When the vehicle 100 is driven in the autonomous mode, the autonomous vehicle 100 can be driven based on an operation system 700. For example, the autonomous vehicle 100 can be driven based on information, data or signal generated in a driving system 710, a parking exit system 740 and a parking system 750.

When the vehicle 100 is driven in the manual mode, the autonomous vehicle 100 can receive a user input for driving through a driving control apparatus 500, and the vehicle 100 can be driven based on the user input received through the driving control apparatus 500.

An overall length refers to a length from a front end to a rear end of the vehicle 100, a width refers to a width of the vehicle 100, and a height refers to a length from a bottom of a wheel to a roof. In the following description, an overall-length direction L refers to a direction which is a criterion for measuring the overall length of the vehicle 100, a width direction W refers to a direction that is a criterion for measuring a width of the vehicle 100, and a height direction H refers to a direction that is a criterion for measuring a height of the vehicle 100.

Figure 7:
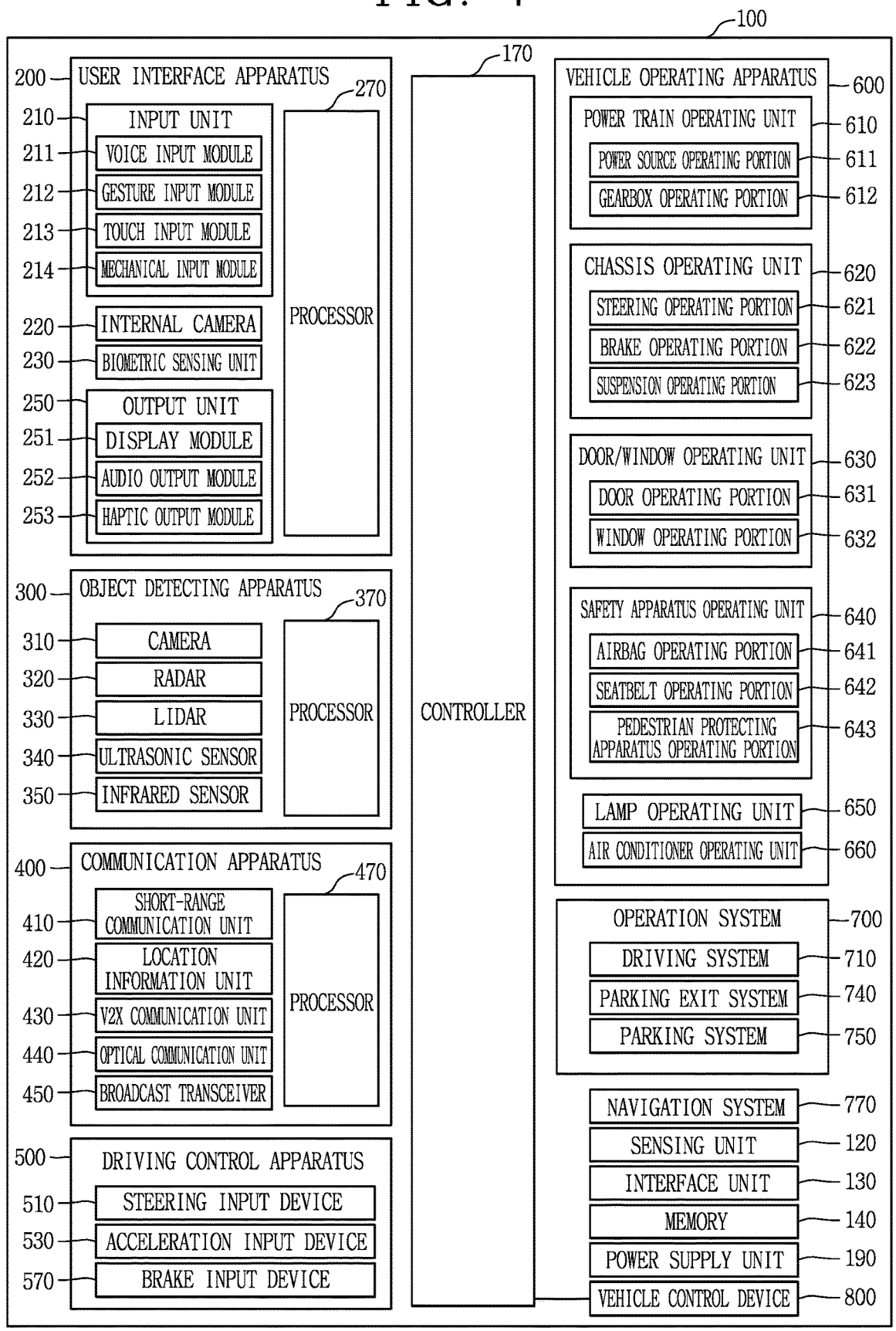
FIG. 7 is a block diagram referred to in explaining a vehicle according to an embodiment of the present disclosure.

As illustrated in FIG. 7, the vehicle 100 may include a user interface apparatus 200, an object detecting apparatus 300, a communication apparatus 400, a driving control apparatus 500, a vehicle operating apparatus 600, an operation system 700, a navigation system 770, a sensing unit 120, an interface unit 130, a memory 140, a controller 170 and a power supply unit 190. Further, the vehicle 100 may include more components in addition to components to be explained in this specification or may not include some of those components to be explained in this specification.

The user interface apparatus 200 is for communication between the vehicle 100 and a user and can receive a user input and provide information generated in the vehicle 100 to the user. The vehicle 200 can also implement user interfaces (UIs) or user experiences (UXs) through the user interface apparatus 200.

The user interface apparatus 200 may include an input unit 210, an internal camera 220, a biometric sensing unit 230, an output unit 250 and a processor 270. Further, the user interface apparatus 200 may include more components in addition to components to be explained in this specification or may not include some of those components to be explained in this specification.

The input unit 200 allows the user to input information and data collected in the input unit 120 can be analyzed by the processor 270 and processed as a user's control command. The input unit 210 can be disposed within the vehicle such as on one area of a steering wheel, one area of an instrument panel, one area of a seat, one area of each pillar, one area of a door, one area of a center console, one area of a headlining, one area of a sun visor, one area of a wind shield, one area of a window or the like.

The input unit 210 may also include a voice input module 211, a gesture input module 212, a touch input module 213, and a mechanical input module 214. The audio input module 211 can convert a user's voice input into an electric signal, and the converted electric signal can be provided to the processor 270 or the controller 170. The voice input module 211 may include at least one microphone.

The gesture input module 212 can convert a user's gesture input into an electric signal and the converted electric signal can be provided to the processor 270 or the controller 170. The gesture input module 212 may include at least one of an infrared sensor and an image sensor for detecting the user's gesture input.

Further, the gesture input module 212 can detect a user's three-dimensional (3D) gesture input. Thus, the gesture input module 212 may include a light emitting diode outputting a plurality of infrared rays or a plurality of image sensors. The gesture input module 212 can detect the user's 3D gesture input by a time of flight (TOF) method, a structured light method or a disparity method.

Further, the touch input module 213 can convert the user's touch input into an electric signal, and the converted electric signal can be provided to the processor 270 or the controller 170. The touch input module 213 may include a touch sensor for detecting the user's touch input.

Also, the touch input module 213 can be integrated with the display unit 251 so as to implement a touch screen. The touch screen thus can provide an input interface and an output interface between the vehicle 100 and the user.

The mechanical input module 214 may include at least one of a button, a dome switch, a jog wheel and a jog switch, and an electric signal generated by the mechanical input module 214 can be provided to the processor 270 or the controller 170. The mechanical input module 214 can also be arranged on a steering wheel, a center fascia, a center console, a cockpit module, a door and the like.

Further, the internal camera 220 can acquire an internal image of the vehicle, and the processor 270 can detect a user's state based on the internal image of the vehicle. The processor 270 can also acquire information related to the user's gaze from the internal image of the vehicle, and can detect a user gesture from the internal image of the vehicle.

The biometric sensing unit 230 can acquire the user's biometric information. The biometric sensing module 230 may include a sensor for detecting the user's biometric information and acquire fingerprint information and heart rate information regarding the user using the sensor. The biometric information can be used for user authentication.

The output unit 250 can generate an output related to a visual, audible or tactile signal. The output unit 250 may include at least one of a display module 251, an audio output module 252 and a haptic output module 253.

The display module 251 can output graphic objects corresponding to various types of information. The display module 251 may include at least one of a liquid crystal display (LCD), a thin film transistor-LCD (TFT LCD), an organic light-emitting diode (OLED), a flexible display, a three-dimensional (3D) display and an e-ink display. The display module 251 can also be inter-layered or integrated with a touch input module 213 to implement a touch screen.

The display module 251 can be implemented as a head up display (HUD). When the display module 251 is implemented as the HUD, the display module 251 can be provided with a projecting module so as to output information through an image which is projected on a windshield or a window. The display module 251 may include a transparent display, which can be attached to the windshield or the window.

The transparent display may have a predetermined degree of transparency and output a predetermined screen thereon. Also, the transparent display may include at least one of a thin film electroluminescent (TFEL), a transparent OLED, a transparent LCD, a transmissive transparent display and a transparent LED display. The transparent display may have adjustable transparency.

In addition, the user interface apparatus 200 may include a plurality of display modules 251a to 251g. For example, the display module 251 can be disposed on one area of a steering wheel, one area 521a, 251b, 251e of an instrument panel, one area 251d of a seat, one area 251f of each pillar, one area 251g of a door, one area of a center console, one area of a headlining or one area of a sun visor, or implemented on one area 251c of a windshield or one area 251h of a window.

Further, the audio output module 252 converts an electric signal provided from the processor 270 or the controller 170 into an audio signal for output. For example, the audio output module 252 may include at least one speaker.

The haptic output module 253 generates a tactile output. For example, the haptic output module 253 may vibrate the steering wheel, a safety belt, a seat 110FL, 110FR, 110RL, 110RR such that the user can recognize such output. The processor 270 can control an overall operation of each unit of the user interface apparatus 200.

According to an embodiment, the user interface apparatus 200 may include a plurality of processors 270 or may not include any processor 270. When the processor 270 is not included in the user interface apparatus 200, the user interface apparatus 200 may operate according to a control of a processor of another apparatus within the vehicle 100 or the controller 170. In addition, the user interface apparatus 200 can be called as a display apparatus for vehicle and can operate according to the control of the controller 170.

The object detecting apparatus 300 is for detecting an object located at outside of the vehicle 100. The object can be a variety of objects associated with driving (operation) of the vehicle 100.

Figure 5:
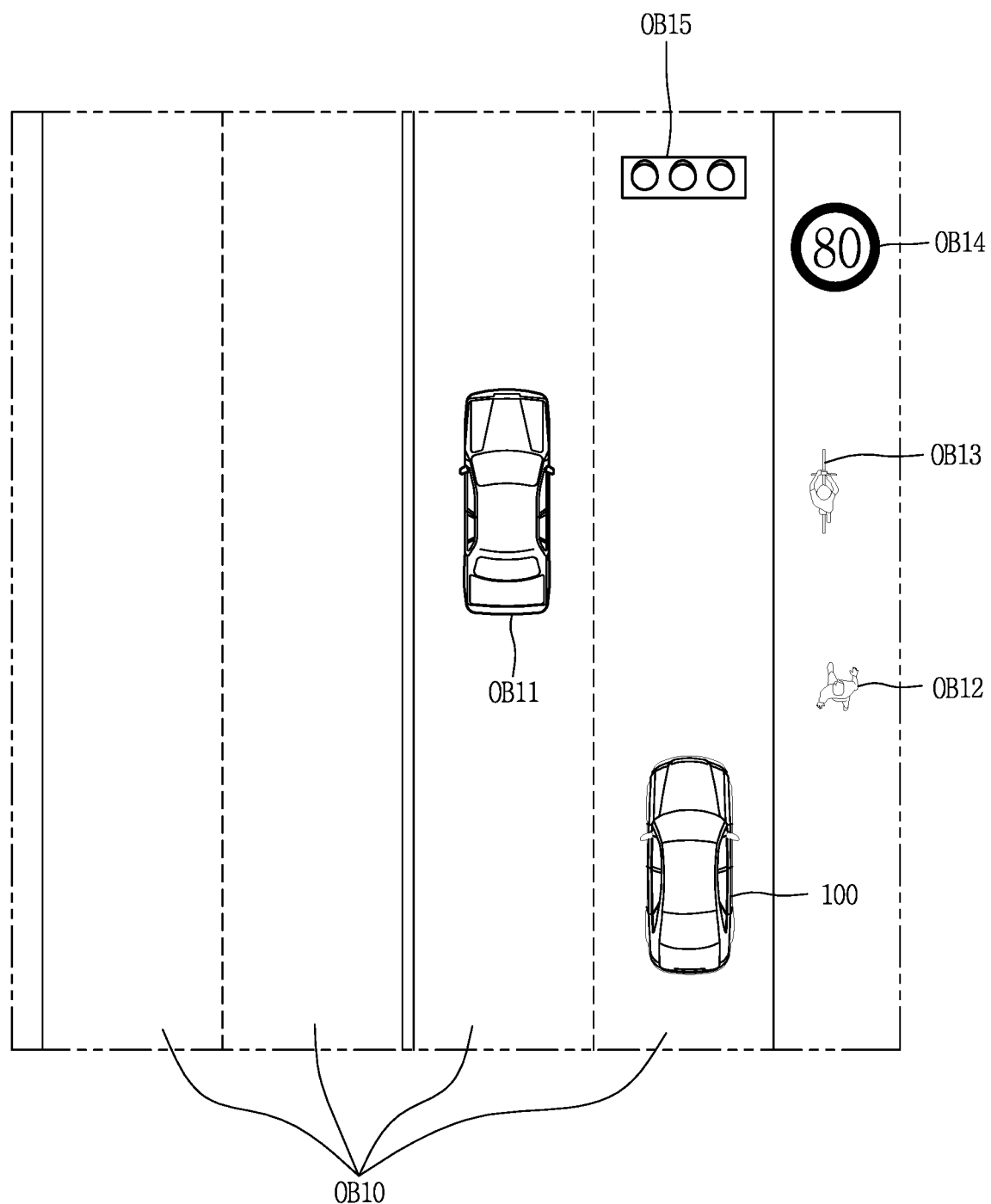
FIGS. 5 and 6 are views referred to in explaining an object according to an embodiment of the present disclosure.
Figure 6:
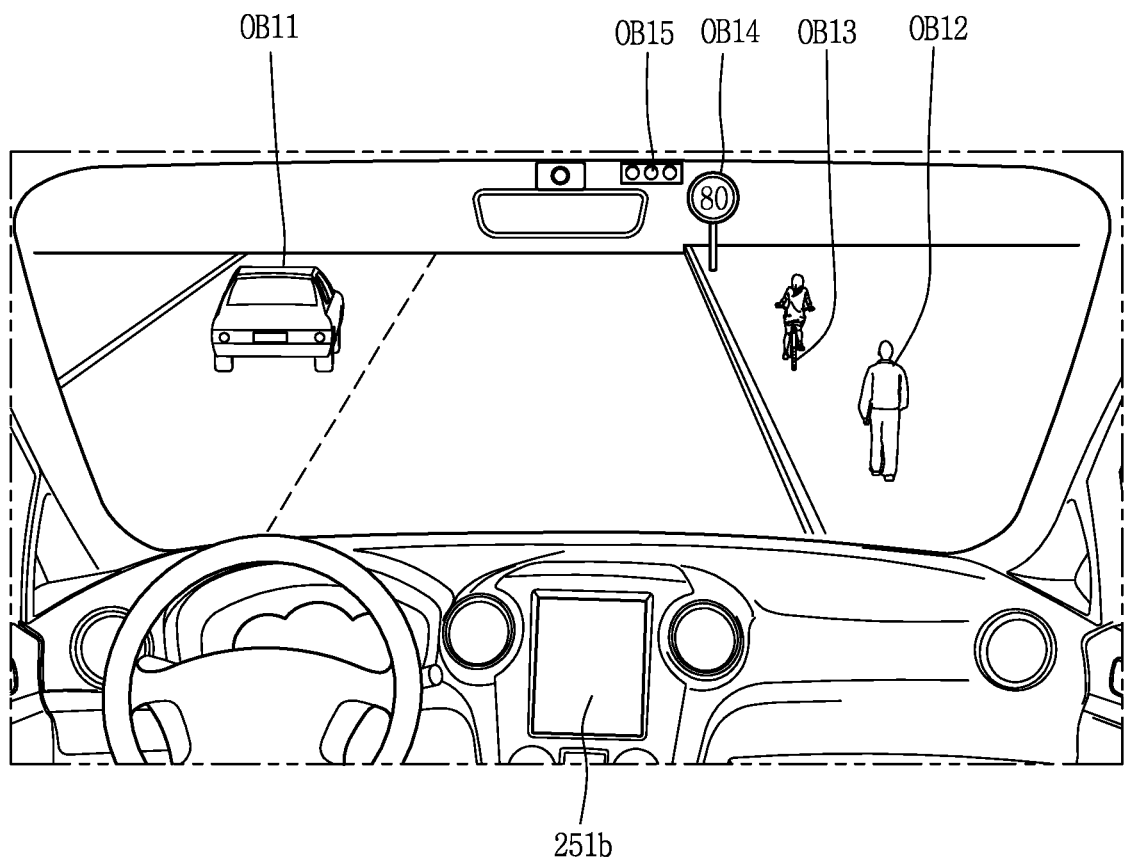

Referring to FIGS. 5 and 6, an object O may include a traffic lane OB10, another vehicle OB11, a pedestrian OB12, a two-wheeled vehicle OB13, traffic signals OB14 and OB15, light, a road, a structure, a speed hump, a geographical feature, an animal and the like. The lane OB01 can be a driving lane, a lane next to the driving lane or a lane on which another vehicle comes in an opposite direction to the vehicle 100. The lanes OB10 can be a concept including left and right lines forming a lane.

The other vehicle OB11 can be a vehicle which is moving around the vehicle 100 and can be a vehicle located within a predetermined distance from the vehicle 100. For example, the other vehicle OB11 can be a vehicle which moves before or after the vehicle 100.

The pedestrian OB12 can be a person located near the vehicle 100 and can be a person located within a predetermined distance from the vehicle 100. For example, the pedestrian OB12 can be a person located on a sidewalk or roadway.

Further, the two-wheeled vehicle OB13 refers to a vehicle (transportation facility) that is located near the vehicle 100 and moves using two wheels and can be a vehicle that is located within a predetermined distance from the vehicle 100 and has two wheels. For example, the two-wheeled vehicle OB13 may be a motorcycle or a bicycle that is located on a sidewalk or roadway.

The traffic signals may include a traffic light OB15, a traffic sign OB14 and a pattern or text drawn on a road surface. The light can be light emitted from a lamp provided on another vehicle. The light can also be light generated from a streetlamp. The light can be solar light.

The road may include a road surface, a curve, an upward slope, a downward slope and the like. The structure can be an object that is located near a road and fixed on the ground. For example, the structure may include a streetlamp, a roadside tree, a building, an electric pole, a traffic light, a bridge and the like.

The geographical feature may include a mountain, a hill and the like. In addition, objects can be classified into a moving object and a fixed object. For example, the moving object can be a concept including another vehicle and a pedestrian, and the fixed object can be a concept including a traffic signal, a road and a structure.

The object detecting apparatus 300 may include a camera 310, a radar 320, a LiDAR 330, an ultrasonic sensor 340, an infrared sensor 350 and a processor 370. According to an embodiment, the object detecting apparatus 300 may further include other components in addition to the components described, or may not include some of the components described.

In addition, the camera 310 can be located on an appropriate portion outside the vehicle to acquire an external image of the vehicle. The camera 310 can be a mono camera, a stereo camera 310a, an around view monitoring (AVM) camera 310b or a 360-degree camera. For example, the camera 310 can be disposed adjacent to a front windshield within the vehicle to acquire a front image of the vehicle. Or, the camera 310 can be disposed adjacent to a front bumper or a radiator grill.

For example, the camera 310 can be disposed adjacent to a rear glass within the vehicle to acquire a rear image of the vehicle. Or, the camera 310 can be disposed adjacent to a rear bumper, a trunk or a tail gate. For example, the camera 310 can be disposed adjacent to at least one of side windows within the vehicle to acquire a side image of the vehicle. Or, the camera 310 can be disposed adjacent to a side mirror, a fender or a door. The camera 310 can provide an acquired image to the processor 370.

In addition, the radar 320 may include electric wave transmitting and receiving portions. The radar 320 can be implemented as a pulse radar or a continuous wave radar according to a principle of emitting electric waves. The radar 320 can also be implemented in a frequency modulated continuous wave (FMCW) manner or a frequency shift Keyong (FSK) manner according to a signal waveform, among the continuous wave radar methods.

Further, the radar 320 can detect an object in a time of flight (TOF) manner or a phase-shift manner through the medium of the electric wave, and detect a position of the detected object, a distance from the detected object and a relative speed with the detected object. The radar 320 can also be disposed on an appropriate position outside the vehicle for detecting an object which is located at a front, rear or side of the vehicle.

The LiDAR 330 may include laser transmitting and receiving portions. The LiDAR 330 can be implemented in a time of flight (TOF) manner or a phase-shift manner. The LiDAR 330 can be implemented as a drive type or a non-drive type. For the drive type, the LiDAR 330 can be rotated by a motor and detect object near the vehicle 100.

For the non-drive type, the LiDAR 330 can detect, through light steering, objects which are located within a predetermined range based on the vehicle 100. The vehicle 100 may include a plurality of non-drive type LiDARs 330. The LiDAR 330 can detect an object in a TOP manner or a phase-shift manner through the medium of a laser beam, and detect a position of the detected object, a distance from the detected object and a relative speed with the detected object. The LiDAR 330 can be disposed on an appropriate position outside the vehicle for detecting an object located at the front, rear or side of the vehicle.

The ultrasonic sensor 340 may include ultrasonic wave transmitting and receiving portions. The ultrasonic sensor 340 can detect an object based on an ultrasonic wave, and detect a position of the detected object, a distance from the detected object and a relative speed with the detected object. The ultrasonic sensor 340 can be disposed on an appropriate position outside the vehicle for detecting an object located at the front, rear or side of the vehicle.

The infrared sensor 350 may include infrared light transmitting and receiving portions. The infrared sensor 340 can detect an object based on infrared light, and detect a position of the detected object, a distance from the detected object and a relative speed with the detected object. The infrared sensor 350 can be disposed on an appropriate position outside the vehicle for detecting an object located at the front, rear or side of the vehicle.

The processor 370 can control an overall operation of each unit of the object detecting apparatus 300. The processor 370 can detect an object based on an acquired image, and track the object. The processor 370 can execute operations, such as a calculation of a distance from the object, a calculation of a relative speed with the object and the like, through an image processing algorithm.

The processor 370 can detect an object based on a reflected electromagnetic wave which an emitted electromagnetic wave is reflected from the object, and track the object. The processor 370 can execute operations, such as a calculation of a distance from the object, a calculation of a relative speed with the object and the like, based on the electromagnetic wave.

In addition, the processor 370 can detect an object based on a reflected laser beam which an emitted laser beam is reflected from the object, and track the object. The processor 370 can execute operations, such as a calculation of a distance from the object, a calculation of a relative speed with the object and the like, based on the laser beam. The processor 370 can detect an object based on a reflected ultrasonic wave which an emitted ultrasonic wave is reflected from the object, and track the object. The processor 370 can execute operations, such as a calculation of a distance from the object, a calculation of a relative speed with the object and the like, based on the ultrasonic wave.

Further, the processor can detect an object based on reflected infrared light which emitted infrared light is reflected from the object, and track the object. The processor 370 can execute operations, such as a calculation of a distance from the object, a calculation of a relative speed with the object and the like, based on the infrared light.

According to an embodiment, the object detecting apparatus 300 may include a plurality of processors 370 or may not include any processor 370. For example, each of the camera 310, the radar 320, the LiDAR 330, the ultrasonic sensor 340 and the infrared sensor 350 may include the processor in an individual manner. When the processor 370 is not included in the object detecting apparatus 300, the object detecting apparatus 300 can operate according to the control of a processor of an apparatus within the vehicle 100 or the controller 170.

The object detecting apparatus 300 can operate according to the control of the controller 170. In addition, the communication apparatus 400 is for performing communication with an external device. Here, the external device can be another vehicle, a mobile terminal or a server. The communication apparatus 400 can also perform the communication by including at least one of a transmitting antenna, a receiving antenna, and radio frequency (RF) circuit and RF device for implementing various communication protocols.

The communication apparatus 400 may include a short-range communication unit 410, a location information unit 420, a V2X communication unit 430, an optical communication unit 440, a broadcast transceiver 450 and a processor 470. According to an embodiment, the communication apparatus 400 may further include other components in addition to the components described, or may not include some of the components described.

The short-range communication unit 410 is for facilitating short-range communications. Suitable technologies for implementing such short-range communications include BLUETOOTH™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, Wireless USB (Wireless Universal Serial Bus), and the like. The short-range communication unit 410 can construct short-range area networks to perform short-range communication between the vehicle 100 and at least one external device.

The location information unit 420 is for acquiring position information. For example, the location information unit 420 may include a Global Positioning System (GPS) module or a Differential Global Positioning System (DGPS) module. The V2X communication unit 430 is a unit for performing wireless communications with a server (Vehicle to Infra; V2I), another vehicle (Vehicle to Vehicle; V2V), or a pedestrian (Vehicle to Pedestrian; V2P). The V2X communication unit 430 may include an RF circuit implementing a communication protocol with the infra (V2I), a communication protocol between the vehicles (V2V) and a communication protocol with a pedestrian (V2P).

The optical communication unit 440 is for performing communication with an external device through the medium of light. The optical communication unit 440 may include a light-emitting diode for converting an electric signal into an optical signal and sending the optical signal to the exterior, and a photodiode for converting the received optical signal into an electric signal.

According to an embodiment, the light-emitting diode can be integrated with lamps provided on the vehicle 100. The broadcast transceiver 450 is for receiving a broadcast signal from an external broadcast managing entity or transmitting a broadcast signal to the broadcast managing entity via a broadcast channel. The broadcast channel may include a satellite channel, a terrestrial channel, or both. The broadcast signal may include a TV broadcast signal, a radio broadcast signal and a data broadcast signal.

The processor 470 can control an overall operation of each unit of the communication apparatus 400. According to an embodiment, the communication apparatus 400 may include a plurality of processors 470 or may not include any processor 470. When the processor 470 is not included in the communication apparatus 400, the communication apparatus 400 may operate according to the control of a processor of another device within the vehicle 100 or the controller 170.

In addition, the communication apparatus 400 may implement a display apparatus for a vehicle together with the user interface apparatus 200. In this instance, the display apparatus for the vehicle can be referred to as a telematics apparatus or an Audio Video Navigation (AVN) apparatus. The communication apparatus 400 may operate according to the control of the controller 170.

The driving control apparatus 500 is for receiving a user input for driving. In a manual mode, the vehicle 100 can be operated based on a signal provided by the driving control apparatus 500. The driving control apparatus 500 may include a steering input device 510, an acceleration input device 530 and a brake input device 570.

The steering input device 510 can receive an input regarding a driving (ongoing) direction of the vehicle 100 from the user. The steering input device 510 is preferably configured in the form of a wheel allowing a steering input in a rotating manner. According to some embodiments, the steering input device may also be configured in a shape of a touch screen, a touchpad or a button.

The acceleration input device 530 can receive an input for accelerating the vehicle 100 from the user. The brake input device 570 can receive an input for braking the vehicle 100 from the user. Each of the acceleration input device 530 and the brake input device 570 is preferably configured in the form of a pedal. According to some embodiments, the acceleration input device or the brake input device may also be configured in a shape of a touch screen, a touchpad or a button.

The driving control apparatus 500 may operate according to the control of the controller 170. The vehicle operating apparatus 600 is for electrically controlling operations of various devices within the vehicle 100. The vehicle operating apparatus 600 may include a power train operating unit 610, a chassis operating unit 620, a door/window operating unit 630, a safety apparatus operating unit 640, a lamp operating unit 650, and an air-conditioner operating unit 660.

According to some embodiments, the vehicle operating apparatus 600 may further include other components in addition to the components described, or may not include some of the components described. In addition, the vehicle operating apparatus 600 may include a processor. Each unit of the vehicle operating apparatus 600 may individually include a processor.

The power train operating unit 610 can control an operation of a power train device. The power train operating unit 610 may include a power source operating portion 611 and a gearbox operating portion 612. The power source operating portion 611 can perform a control for a power source of the vehicle 100.

For example, upon using a fossil fuel-based engine as the power source, the power source operating portion 611 can perform an electronic control for the engine. Accordingly, an output torque and the like of the engine can be controlled.

The power source operating portion 611 can adjust the engine output torque according to the control of the controller 170.

For example, upon using an electric energy-based motor as the power source, the power source operating portion 611 can perform a control for the motor. The power source operating portion 611 can adjust a rotating speed, a torque and the like of the motor according to the control of the controller 170.

The gearbox operating portion 612 can perform a control for a gearbox. The gearbox operating portion 612 can adjust a state of the gearbox. The gearbox operating portion 612 may change the state of the gearbox into drive (forward) (D), reverse (R), neutral (N) or parking (P).

In addition, when an engine is the power source, the gearbox operating portion 612 can adjust a locked state of a gear in the drive (D) state. The chassis operating unit 620 can control an operation of a chassis device. The chassis operating unit 620 may include a steering operating portion 621, a brake operating portion 622 and a suspension operating portion 623.

The steering operating portion 621 can perform an electronic control for a steering apparatus within the vehicle 100. The steering operating portion 621 can change a driving direction of the vehicle. The brake operating portion 622 can perform an electronic control for a brake apparatus within the vehicle 100. For example, the brake operating portion 622 can control an operation of brakes provided at wheels to reduce speed of the vehicle 100.

In addition, the brake operating portion 622 can individually control each of a plurality of brakes. The brake operating portion 622 can differently control braking force applied to each of a plurality of wheels. The suspension operating portion 623 can perform an electronic control for a suspension apparatus within the vehicle 100. For example, the suspension operating portion 623 can control the suspension apparatus to reduce vibration of the vehicle 100 when a bump is present on a road.

In addition, the suspension operating portion 623 can individually control each of a plurality of suspensions. The door/window operating unit 630 can perform an electronic control for a door apparatus or a window apparatus within the vehicle 100. The door/window operating unit 630 may include a door operating portion 631 and a window operating portion 632.

The door operating portion 631 can perform the control for the door apparatus and can control opening or closing of a plurality of doors of the vehicle 100. The door operating portion 631 can control opening or closing of a trunk or a tail gate. The door operating portion 631 can control opening or closing of a sunroof.

Further, the window operating portion 632 can perform the electronic control for the window apparatus and can control opening or closing of a plurality of windows of the vehicle 100. The safety apparatus operating unit 640 can perform an electronic control for various safety apparatuses within the vehicle 100.

The safety apparatus operating unit 640 may include an airbag operating portion 641, a seatbelt operating portion 642 and a pedestrian protecting apparatus operating portion 643. The airbag operating portion 641 can perform an electronic control for an airbag apparatus within the vehicle 100. For example, the airbag operating portion 641 can control the airbag to be deployed upon a detection of a risk.

The seatbelt operating portion 642 can perform an electronic control for a seatbelt apparatus within the vehicle 100. For example, the seatbelt operating portion 642 can control passengers to be motionlessly seated in seats 110FL, 110FR, 110RL, 110RR using seatbelts upon a detection of a risk.

The pedestrian protecting apparatus operating portion 643 can perform an electronic control for a hood lift and a pedestrian airbag. For example, the pedestrian protecting apparatus operating portion 643 can control the hood lift and the pedestrian airbag to be open up upon detecting pedestrian collision.

The lamp operating unit 650 can perform an electronic control for various lamp apparatuses within the vehicle 100. The air-conditioner operating unit 660 can perform an electronic control for an air conditioner within the vehicle 100. For example, the air-conditioner operating unit 660 can control the air conditioner to supply cold air into the vehicle when internal temperature of the vehicle is high.

The vehicle operating apparatus 600 may include a processor. Each unit of the vehicle operating apparatus 600 can individually include a processor. The vehicle operating apparatus 600 may operate according to the control of the controller 170. The operation system 700 is a system that controls various driving modes of the vehicle 100. The operation system 700 may include a driving system 710, a parking exit system 740 and a parking system 750.

Further, the operation system 700 may further include other components in addition to components to be described, or may not include some of the components to be described. In addition, the operation system 700 may include a processor. Each unit of the operation system 700 may individually include a processor.

Further, the operation system can be a sub concept of the controller 170 when it is implemented in a software configuration. In addition, according to embodiment, the operation system 700 can be a concept including at least one of the user interface apparatus 200, the object detecting apparatus 300, the communication apparatus 400, the vehicle operating apparatus 600 and the controller 170.

The driving system 710 can perform driving of the vehicle 100. The driving system 710 can receive navigation information from a navigation system 770, transmit a control signal to the vehicle operating apparatus 600, and perform driving of the vehicle 100.

The driving system 710 can receive object information from the object detecting apparatus 300, transmit a control signal to the vehicle operating apparatus 600 and perform driving of the vehicle 100. The driving system 710 can also receive a signal from an external device through the communication apparatus 400, transmit a control signal to the vehicle operating apparatus 600, and perform driving of the vehicle 100.

The parking exit system 740 can perform an exit of the vehicle 100 from a parking lot. The parking exit system 740 can receive navigation information from the navigation system 770, transmit a control signal to the vehicle operating apparatus 600, and perform the exit of the vehicle 100 from the parking lot. The parking exit system 740 can also receive object information from the object detecting apparatus 300, transmit a control signal to the vehicle operating apparatus 600 and perform the exit of the vehicle 100 from the parking lot.

Further, the parking exit system 740 can receive a signal from an external device through the communication apparatus 400, transmit a control signal to the vehicle operating apparatus 600, and perform the exit of the vehicle 100 from the parking lot. The parking system 750 can perform parking of the vehicle 100 and can receive navigation information from the navigation system 770, transmit a control signal to the vehicle operating apparatus 600, and park the vehicle 100.

The parking system 750 can also receive object information from the object detecting apparatus 300, transmit a control signal to the vehicle operating apparatus 600 and park the vehicle 100. The parking system 750 can receive a signal from an external device through the communication apparatus 400, transmit a control signal to the vehicle operating apparatus 600, and park the vehicle 100.

In addition, the navigation system 770 provides navigation information including at least one of map information, information regarding a set destination, path information according to the set destination, information regarding various objects on a path, lane information and current location information of the vehicle. The navigation system 770 may include a memory and a processor, and the memory can store the navigation information.

Further, the processor can control an operation of the navigation system 770. Further, the navigation system 770 can update prestored information by receiving information from an external device through the communication apparatus 400. The navigation system 770 can be classified as a sub component of the user interface apparatus 200. The sensing unit 120 may sense a status of the vehicle.

In addition, the sensing unit 120 may include a posture sensor (e.g., a yaw sensor, a roll sensor, a pitch sensor, etc.), a collision sensor, a wheel sensor, a speed sensor, a tilt sensor, a weight-detecting sensor, a heading sensor, a gyro sensor, a position module, a vehicle forward/backward movement sensor, a battery sensor, a fuel sensor, a tire sensor, a steering sensor by a turn of a handle, a vehicle internal temperature sensor, a vehicle internal humidity sensor, an ultrasonic sensor, an illumination sensor, an accelerator position sensor, a brake pedal position sensor, and the like. The sensing unit 120 can acquire sensing signals with respect to vehicle-related information, such as a posture, a collision, an orientation, a position (GPS information), an angle, a speed, an acceleration, a tilt, a forward/backward movement, a battery, a fuel, tires, lamps, internal temperature, internal humidity, a rotated angle of a steering wheel, external illumination, pressure applied to an accelerator, pressure applied to a brake pedal and the like.

The sensing unit 120 may further include an accelerator sensor, a pressure sensor, an engine speed sensor, an air flow sensor (AFS), an air temperature sensor (ATS), a water temperature sensor (WTS), a throttle position sensor (TPS), a TDC sensor, a crank angle sensor (CAS), and the like.

The interface unit 130 may serve as a path allowing the vehicle 100 to interface with various types of external devices connected thereto. For example, the interface unit 130 can be provided with a port connectable with a mobile terminal, and connected to the mobile terminal through the port. In this instance, the interface unit 130 can exchange data with the mobile terminal.

In addition, the interface unit 130 serves as a path for supplying electric energy to the connected mobile terminal. When the mobile terminal is electrically connected to the interface unit 130, the interface unit 130 supplies electric energy supplied from a power supply unit 190 to the mobile terminal according to the control of the controller 170.

The memory 140 is electrically connected to the controller 170 and can store basic data for units, control data for controlling operations of units and input/output data. The memory 140 can be a variety of storage devices, such as ROM, RAM, EPROM, a flash drive, a hard drive and the like in a hardware configuration. The memory 140 can also store various data for overall operations of the vehicle 100, such as programs for processing or controlling the controller 170. Further, the memory 140 can be integrated with the controller 170 or implemented as a sub component of the controller 170.

The controller 170 can control an overall operation of each unit of the vehicle 100 and can be referred to as an Electronic Control Unit (ECU). The power supply unit 190 can supply power required for an operation of each component according to the control of the controller 170. Specifically, the power supply unit 190 can receive power supplied from an internal battery of the vehicle, and the like.

At least one processor and the controller 170 included in the vehicle 100 may be implemented using at least one of application specific integrated circuits (ASICs), digital signal processors (DSPs), digital signal processing devices (DSPDs), programmable logic devices (PLDs), field programmable gate arrays (FPGAs), processors, controllers, micro controllers, microprocessors, and electric units performing other functions.

Figure 8:
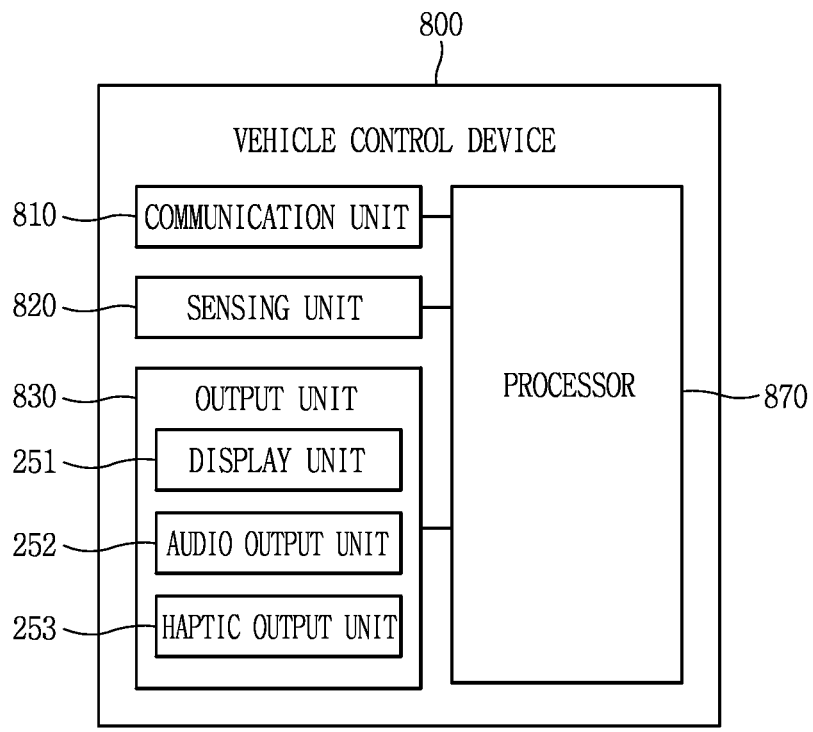
FIG. 8 is a conceptual view illustrating a vehicle control device according to an embodiment of the present disclosure.

Hereinafter, components included in the vehicle control device 800 according to an embodiment of the present disclosure will be will be described in detail with reference to the accompanying drawings. In particular, FIG. 8 is a block diagram illustrating a vehicle control device according to an embodiment of the present disclosure.

The vehicle control device 800 related to the present disclosure may include a communication unit 810, a sensing unit 820, an output unit 830, and a processor 870. The communication unit 810 can be the aforementioned communication device 400. The communication unit 810 can be connected to be available for communicating with a mobile terminal present within the vehicle 100.

For example, the vehicle control device 800 (or the vehicle 100) and the mobile terminal can be connected for wireless communication through the communication unit 810. The vehicle control device 800 and the mobile terminal can be wirelessly connected for mutual wireless communication according to a user request, or when the vehicle control device 800 and the mobile terminal have once been connected for wireless communication, when the mobile terminal enters the inside of the vehicle, the mobile terminal can be wirelessly connected to the vehicle control device 800 for mutual wireless communication.

The communication unit 810 can be provided within the vehicle (or within the vehicle control device) or can be provided as a separate module to communicate with (or to be electrically coupled to) a component of the vehicle. The vehicle control device 800 can also control the mobile terminal through the communication unit 810.

In more detail, the vehicle control device 1800 can transmit a control signal for controlling the mobile terminal to the mobile terminal through the communication unit 810. When the control signal is received, the mobile terminal can perform a function/operation/control corresponding to the control signal.

It is also possible for the mobile terminal to control the vehicle control device 800 (or the vehicle 100). In more detail, the mobile terminal can transmit a control signal for controlling the vehicle to the vehicle control device 800. In response, the vehicle control device 800 can perform a function/operation/control corresponding to the control signal transmitted from the mobile terminal.

The communication unit 810 can communicate with an external device existing outside the vehicle (e.g., an external server, a cloud server (or a cloud), the Internet, an infrastructure installed on the road, another vehicle, etc.). Further, the communication unit 810 can perform communication with another vehicle.

In addition, the communication unit 810 can receive information related to an external event which occurs outside the vehicle from the external device. The reception of such information can be performed under the control of the processor 870 or an external device, for example. Further, the communication unit 810 can receive location information of the vehicle and determine a current location of the vehicle through the location information unit 420 or the V2X communication unit 430.

Specifically, the communication unit 810 receives the current location information of the vehicle using the GPS module included in the location information unit, or receives the current location information from the other vehicle or an external device (e.g., an infrastructure) via the V2X communication unit 430. In addition, the communication unit 810 can receive information related to an external event from another vehicle via the V2X communication unit 430.

In addition, the sensing unit 820 may be the object detecting apparatus 300 described with reference to FIG. 7 or the sensing unit 120 provided in the vehicle 100. The sensing unit 820 may include a camera such as an internal camera configured to photograph the interior of the vehicle and an external camera configured to photograph the exterior of the vehicle. The sensing unit 820 can also sense a direction of a sight line of the driver using the internal camera.

Also, the sensing unit 820 can photograph the outside of the vehicle using the external camera and sense at least one of a situation outside of the vehicle or a situation inside the vehicle. For example, the sensing unit 820 can be implemented by combining at least two of the camera 310, the radar 320, the LiDAR 330, the ultrasonic sensor 340, the infrared sensor 350, and the sensing unit 120 included in the object detecting device 300.

The sensing unit 820 can also sense information related to the vehicle 100. The information related to the vehicle may be at least one of vehicle information (or a driving state of the vehicle) and surrounding information of the vehicle. For example, the vehicle information may include a driving speed of a vehicle, a weight of the vehicle, the number of occupants of the vehicle, braking power of the vehicle, maximum braking power of the vehicle, a driving mode of the vehicle (whether it is an autonomous driving mode or a manual driving mode), a parking mode of the vehicle (autonomous parking mode, automatic parking mode, or a manual parking mode), whether the user is present in the vehicle, and information related to the user (e.g., whether the user is an authenticated user or not), and the like.

The surrounding information of the vehicle may include, for example, a state (frictional force) of a road surface on which the vehicle is driving, weather, a distance to a preceding vehicle (or subsequent vehicle), a relative speed of a preceding vehicle (or a subsequent vehicle), a bending rate of a curve when a lane in which the vehicle is driving is a curve, information related to an object present within a reference region (predetermined region) with respect to the vehicle, whether an object enters/leaves the predetermined region, whether a user is present in the vicinity of the vehicle, information related to the user (e.g., whether the user is an authenticated user or not), and the like.

Also, the surrounding information (or surrounding environmental information) of the vehicle may include external information of the vehicle (e.g., peripheral brightness, temperature, location of the sun, information of a peripheral subject (person, another vehicle, a sign, etc.), a type of a road surface on which the vehicle is driving, a geographic feature, line information, or lane information), and information required for autonomous driving/autonomous parking/automatic parking/manual parking mode. Also, the surrounding information of the vehicle may further include a distance between an object present in the vicinity of the vehicle 100 and the vehicle 100, a type of the object, a parking space in which the vehicle may park, an object (e.g., a parking line, a string, another vehicle, a wall, etc.) for identifying the parking space, and the like.

Further, the information related to the vehicle includes whether the mobile terminal is placed in a cradle provided in the vehicle, whether the mobile terminal is introduced to (is present in) the vehicle, or whether the mobile terminal has entered a predetermined distance from the vehicle (whether the mobile terminal is present within the predetermined distance from the vehicle), whether the mobile terminal and the vehicle control device are communicatively connected, and the like.

The information related to the vehicle sensed through the sensing unit 820 can be used in an autonomous driving mode for autonomous driving of the vehicle. Specifically, the processor 870 can cause the vehicle to autonomously run using the information related to the vehicle sensed through the sensing unit 820.

In addition, the external situation of the vehicle, which is sensed by the sensing unit 820, includes, for example, an external event. The external event refers to an event that changes a running state of the vehicle. For example, the external event that changes a running state of the vehicle may include a speed bump, a curved section, a construction section, an accident section, a hill section, a downhill section, and a situation in which an ambulance is approaching, and the like.

By the external event, a running state of the vehicle can be changed, for example, the vehicle is bumped, accelerated/decelerated, skewed, and the like. In addition, the sensing unit 820 can sense an internal state of the vehicle. For example, an internal state of the vehicle includes a state of an object existing inside the vehicle or a state of the user.

The state of the object may include when a running state of the vehicle is changed by an external event and when an object is placed to drop due to the change in the running state of the vehicle. For example, when a particular object, without being fixed, is placed on a dashboard, a seat, or a rack provided in the vehicle, the specific object can be placed to be prone to drop due to the change in the running state of the vehicle.

The state of the user can include when the driver holds a drink, when the driver is conversing with a passenger, when the driver is making a call, when the driver is sleeping in an autonomous driving mode, when the backrest of the driver's seat is laid down by more than a certain angle in the autonomous driving mode, when the driver's seat is rotated with respect to the front in the autonomous driving mode, or when a user gets in an infant car seat.

In addition, the output unit 830 may be the output unit 250 described with reference to FIG. 7. As shown in FIG. 8, the output unit 830 may include a display unit 251, and an audio output unit 252, and a haptic output unit 253.

The output unit 830 can be configured to output information received from an external device. The information received at the external device may be, for example, guidance information related to an external event. The guidance information related to the external event can be displayed as a predetermined graphic object (for example, image, video, text, 3D information, or the like) through the display unit 251, can be output in the form of a sound through the audio output unit 252, or can be output in the form of vibration through the haptic output unit 253.

The display unit 251 may include an output unit (for example, a touch screen) of a mobile terminal that can communicate with the communication apparatus 400. The audio output unit 252 may include an audio output unit of the mobile terminal capable of communicating with the communication apparatus 400. The haptic output unit 253 may include a haptic output unit of the mobile terminal.

In addition, the display unit 251 may include a transparent display. The transparent display can be attached to a windshield or window. That is, the display unit 251 of the present invention may include a windshield and a window. In this disclosure, outputting by the processor 870 any information (or graphic object) on the display unit 251 may include outputting any information (or graphic object) on the window.

The display unit 251 can be disposed on one area of a steering wheel, one area 251a, 251b, or 251e of an instrument panel, one area 251d of a seat, one area 251f of each pillar, one area 251g of a door, one area of a center console, one area of a headlining, and one area of a sun visor, or can be implemented in one area 251c of a wind shield, one area 251h of a window, or the like. For example, the display unit 251 may include a cluster, a center information display (CID), a navigation device, and a head-up display (HUD). For example, the display unit 251 may include a cluster, a center fascia display (CID), a navigation device, and a head-up display (HUD).

The display unit 251 may form an inter-layer structure with the touch sensor or can be integrally formed to realize a touch screen. The touch screen functions as an input unit 210 that provides an input interface between the vehicle 100 (or the vehicle control device 800) and the user and also provides an output interface between the vehicle 100 (or the vehicle control device 800) and the user.

The processor 870 can output various information related to the vehicle to the display unit 251. In addition, the processor 870 can output information related to the vehicle to different positions of the display unit 251 according to types of information related to the vehicle. The display unit 251 can be a navigation system 770 (or a navigation device). In addition, the display unit 251 may include a navigation system 770.

The processor 870 can control the communication unit 810, the sensing unit 820, the output unit 830, and the like. The processor 870 can be the controller 170 described with reference to FIG. 7

Further, the processor 870 can control the components described in FIG. 7 and the components described in FIG. 8. The processor 870 can detect (sense) an external event that occurs outside the vehicle through the communication unit 810 or the sensing unit 820. In addition, the processor 870 can detect (sense) an internal situation of the vehicle through the sensing unit 820.

The processor 870 can output different pieces of guidance information related to the sensed external event through the output unit 830 based on the detected internal situation of the vehicle. That is, although the same external event (or the same kind of external event) is detected outside the vehicle, the processor 870 of the present invention can output different guidance information according to internal situations of the vehicle.

For example, when the same external event (or the same kind of external event) is detected, if the internal situation of the vehicle is a first situation, the processor 870 can output first guidance information (i.e., first guidance information related to the external event) through the output unit 830. When the same external event (or the same kind of external event) is detected, if the internal situation of the vehicle is a second situation different from the first situation, the processor 870 can output second guidance information (i.e., second guidance information related to the external event) different from the first guidance information through the output unit 830.

Figure 10:
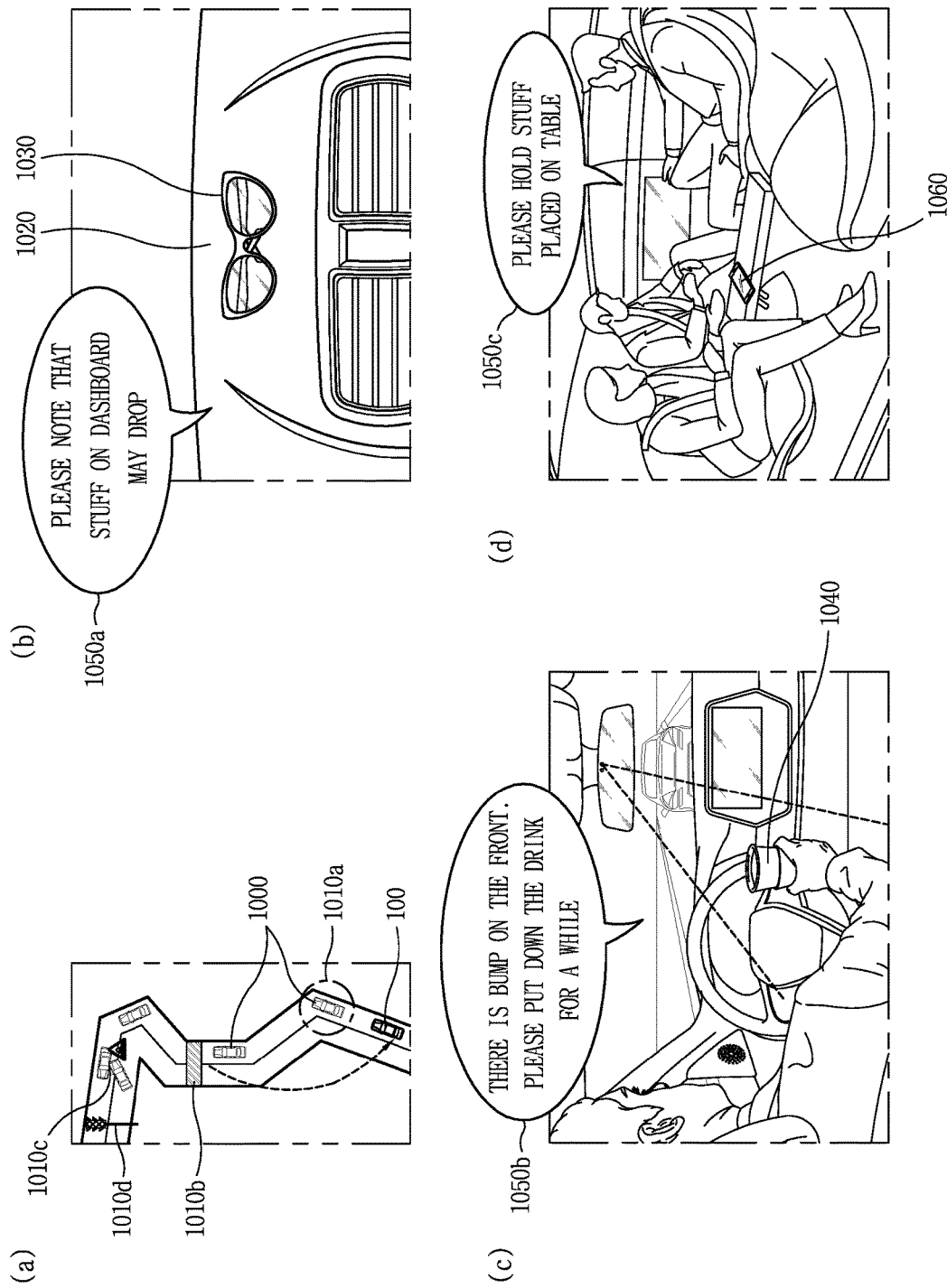
FIGS. 10, 11, and 12 are conceptual views illustrating the control method illustrated in FIG. 9 in more detail.
Figure 11:
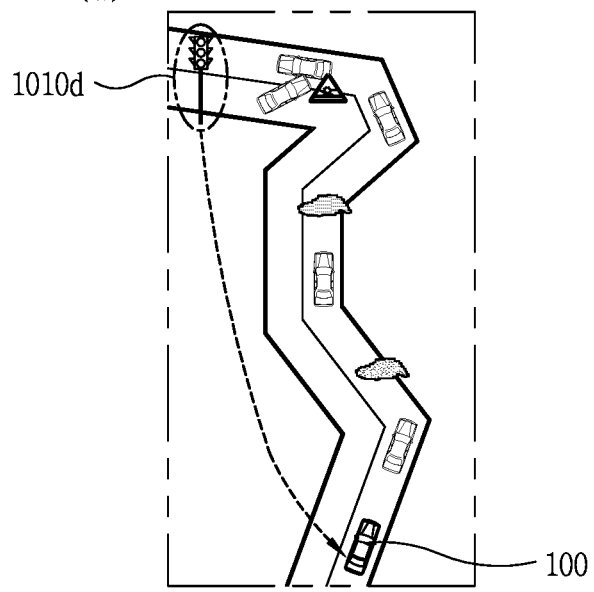
Figure 11:
Figure 12:
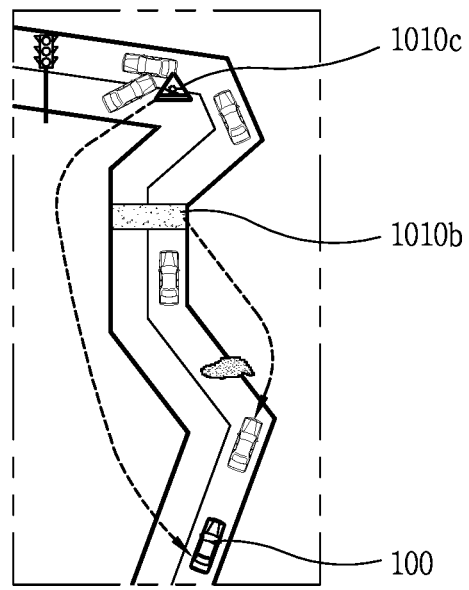
Figure 12:
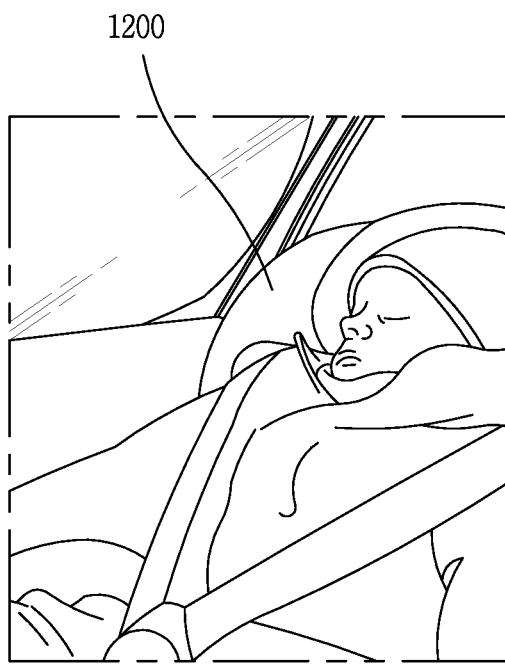
Figure 13:
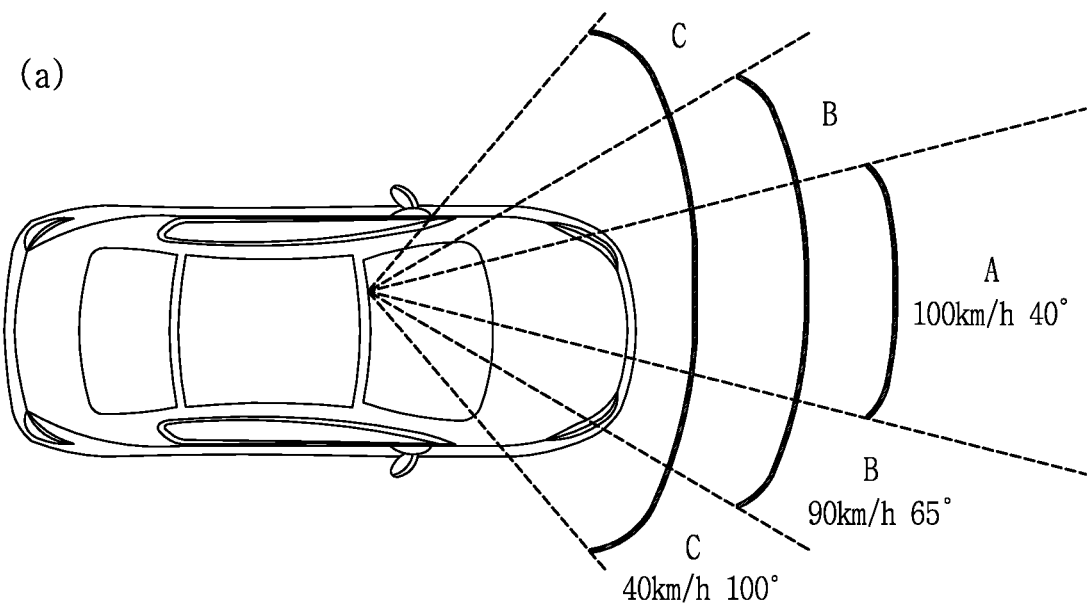
FIGS. 13, 14, 15, 16, and 17 are conceptual views illustrating a method of outputting guidance information for various situations according to an embodiment of the present invention.
Figure 13:
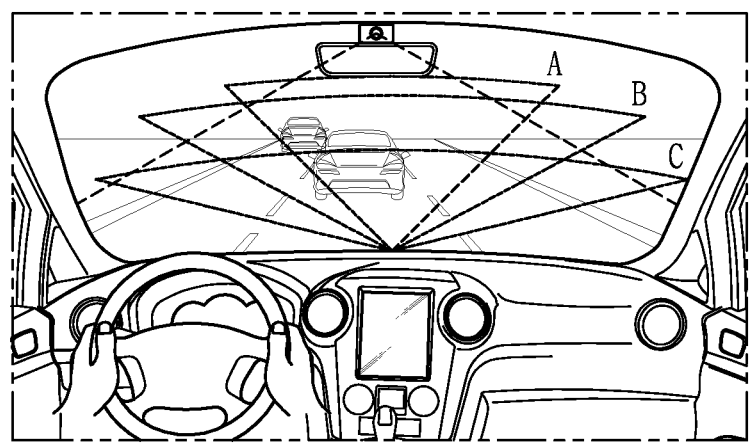

Hereinafter, a method of outputting optimized guidance information according to internal situations of a vehicle when an event occurs outside the vehicle will be described in more detail with reference to the accompanying drawings. In particular, FIG. 9 is a flowchart illustrating a typical control method of the present invention, and FIGS. 10-12 are conceptual views for more specifically explaining the control method illustrated in FIG. 9.

Figure 9:
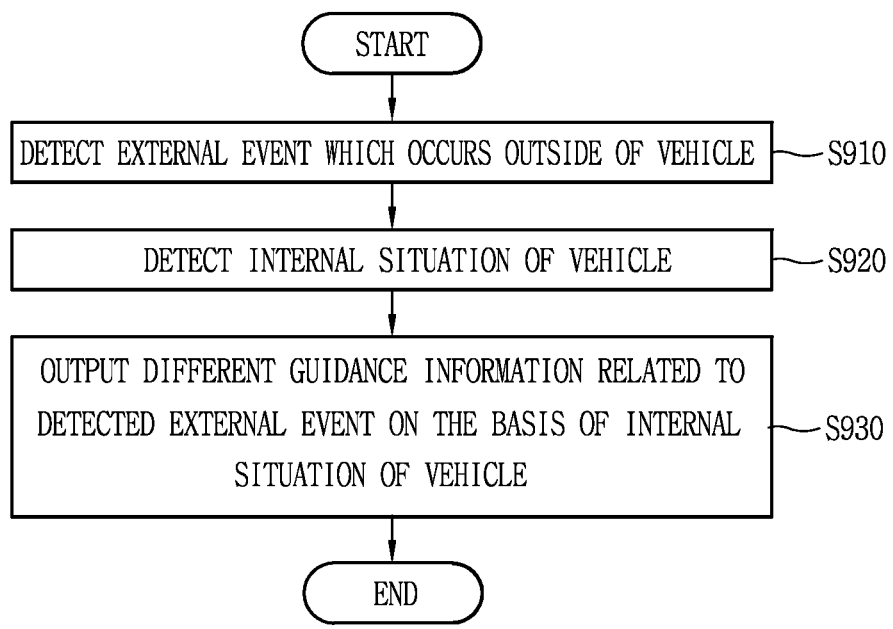
FIG. 9 is a flowchart illustrating a typical control method of the present invention.

Referring to FIG. 9, in the present invention, an external event that occurs outside the vehicle is detected (S910). Specifically, the processor 870 can detect an external event that occurs outside the vehicle through the communication unit 810 or the sensing unit 820. For example, referring to FIG. 10(a), the external event may include various events such as a curve section 1010a, a speed bump 1010b, a port hole, a bump topography, an accident 1010c, and a traffic light change 1010d, and the like.

In addition, the external event refers to an event in which a running state of the vehicle is to be changed. The change of the running state of the vehicle may include that the vehicle is bumped, accelerated/decelerated, tilted, and the like. For example, an external event that changes the running state of the vehicle may include a speed bump, a curved section, a port hole, a construction section, an accident section, a hill section, a downhill section, a situation in which an ambulance is approaching, a signal of a traffic light is changed to a stop signal, and the like.

The processor 870 can detect the external event from an external device (for example, another vehicle 1000 or an infrastructure (e.g., a road side unit (RSU)) or an external server) installed on the road via the communication unit 810. For example, when information related to an external event detected in the external device is received through the communication unit 810, the processor 870 can detect the external event based on the received information related to the external event.

The information related to the external event may include various types of information such as a location where the external event has occurred, a type of the external event, information on a change in a running state of the vehicle caused by the external event, and the like. The sensing unit 820 may include a camera configured to photograph the outside of the vehicle.

Further, the external event may be a predetermined event (or an event linked to output guidance information) to output the guidance information. When the information related to the external event is received from the external server (for example, the infrastructure (the RSU) installed on the road) or another vehicle through the communication unit 810, the processor 870 can detect the external event.

In addition, the processor 870 can sense the external event based on an image received through the camera of the sensing unit 820. In addition, the processor 870 can sense an external event that occurs within a predetermined distance from the vehicle through the sensing unit 820. For example, the processor 870 can receive an image through a camera included in the sensing unit 820 and analyze the image to identify (detect) external events generated within the predetermined distance from the vehicle.

The camera included in the sensing unit 820 can be a camera disposed to image the outside of the vehicle and may include, for example, a black box, an around view monitor (AVM) camera, and the like. The camera can also be installed inside the vehicle or outside the vehicle.

Referring back to FIG. 9, in the present invention, when the external event is detected, an internal situation of the vehicle is detected (S920). In particular, the processor 870 can detect the internal situation of the vehicle by using the sensing unit 820, for example. The sensing unit 820 may include an internal camera 220 configured to photograph the interior of the vehicle. In addition, the processor 870 can receive the image through the internal camera 220 and analyze the received image to detect the internal situation of the vehicle.

The internal situation of the vehicle may include a state of an object existing inside the vehicle or a state of the user. For example, as shown in FIG. 10(*b*), the object present inside the vehicle may include, for example, an object 1030 placed on the dashboard (or instrument panel) 1020, without being fixed, an object placed on a vehicle seat, without being fixed, a cup filled with a beverage, and the like.

That is, the state of an object existing in the vehicle refers to when a change in the vehicle running state is caused by an external event and it is determined that the object will drop due to the change in the vehicle running state. In addition, the state of the user can refer to a specific action made by the user (for example, a driver) aboard the vehicle or a specific state of the user.

For example, the state of the user may include when the driver (or passenger) is holding a drink 1040 as illustrated in (c) of FIG. 10, when a driver is conversing with passengers as illustrated in (d) of FIG. 10, when the driver is making a call, when the driver is asleep in the autonomous driving mode and when a backrest of the driver is laid down at a predetermined angle or greater as illustrated in (b) of FIG. 11, when the driver's seat is rotated in relation to the front side in the autonomous driving mode as illustrated in (d) of FIG. 10, and when a user is seated in an infant car seat 1200 as illustrated in (d) of FIG. 12.

That is, the internal situation of the vehicle described in the present disclosure includes any situation that may occur in the inside of the vehicle. In particular, it refers to a situation where an uncomfortable thing happens to a user aboard in the vehicle due to an external event.

Referring back to FIG. 9, in the present invention, when an external event is detected outside the vehicle and an internal situation of the vehicle is detected, different guidance information related to the detected external event is output to the output unit (S930). Specifically, when the external event that occurs outside the vehicle is sensed through the communication unit 810 or the sensing unit 820, the processor 870 can sense an internal situation of the vehicle through the sensing unit 820.

Thereafter, the processor 870 can output guidance information related to the external event through the output unit 830. Here, the processor 870 can output different guidance information related to the external event according to the detected internal situation of the vehicle.

The processor 870 can output different guidance information related to the same external event based on the internal situation (e.g., at least one of the state of the object or the state of the user) sensed by the sensing unit 820. In other words, the processor 870 can output different guidance information according to the internal situation of the vehicle, although the same external event (or the same kind of external event) is detected.

For example, when the same external event is detected, and the internal situation of the vehicle is the first situation, the processor 870 can output first guidance information (first guidance information related to the external event) through the output unit 830, and when the internal situation of the vehicle is the second situation different from the first situation, the processor 870 can output second guidance information (second guidance information related to the external event) different from the first guidance information.

As illustrated in (a) of FIG. 10, an example in which the external event is a speed bump will be described. In the present invention, when an external event is detected, information regarding whether a user state that can be disturbed by the external event is detected, or whether a problematic object is placed in the vehicle can be provided to the user.

As illustrated in (b) of FIG. 10, the processor 870 determines that a change in the vehicle running state (for example, moving up and down) is caused by an external event (for example, a speed bump) and an internal situation of the vehicle in which the object 1030 is not fixed but placed in a space (for example, on the dashboard 1020, a vehicle seat, a rack, etc.) in the vehicle due to the change in the vehicle running state.

If it is determined that the object will drop due to the change in the vehicle running state, the processor 870 can output a first type of notification information 1050*a* (e.g., "Please note that the stuff (object) on the dashboard may drop") on the output unit 830. In addition, when the external event (for example, speed bump) is detected, the processor 870 can output second type of notification information different from the first type of notification information, based on a state of the user included in the internal state of the vehicle.

Here, the processor 870 can output two different types of notification information according to the state of the driver sensed in the vehicle. For example, as illustrated in (c) of FIG. 10, when the external event (for example, a speed braking) is sensed, if the internal situation of the vehicle interior is detected that the user is holding a drink, the second type of guidance information 1050*b* (for example, "There is a bump on the front. Please put down the drink for a while") different from the first type can be output through the output unit 830.

In another example, as illustrated in (d) of FIG. 10, when the external event (for example, speed bump) is sensed, if the internal state of the vehicle is the driver talking with the passenger, when the driver's seat is rotated with respect to the front in the autonomous driving mode, or when an object is placed, without being fixed, on the rack 1060 provided in the vehicle, the processor 870 can output a third type guidance information 1050*c* (e.g., "please hold the stuff placed on the table" or "please pay attention to the speed bump") different from the first type and the second type, through the output unit 830.

That is, regarding the same external event, the present invention can output different guidance information according to the internal situation of the vehicle. In addition, based on a correlation between the external event and the internal state of the vehicle (i.e., a situation to occur in the vehicle due to the external event), the processor 870 can output different guidance information according to an internal situation of the vehicle even though the same external event occurs.

In addition, when route information is set before the vehicle starts running, the processor 870 can determine (detect) an external event which occurs on the route to which the vehicle is to be driven through the communication unit 810 based on the route information. Further, the processor 870 can output the guidance information related to the external event through the output unit before the vehicle starts running. Specifically, when a destination is set according to the user's request, the processor 870 may set information regarding a route through which the vehicle may drive from the current vehicle location to the destination.

The setting of the route information can be performed before the vehicle starts or after the vehicle starts. The processor 870 can receive information related to an external even that occurs on a route corresponding to the route information from an external server through the communication unit 810.

When the information related to the external event is received, the processor 870 can sense an internal situation of the vehicle through the sensing unit 820. Thereafter, the processor 870 can output different guidance information related to the external event, based on the detected internal situation of the vehicle.

In addition, if the internal situation of the vehicle is maintained even after the guidance information related to the external event is output, the processor 870 may change the set route information not to pass through a point where the external event has occurred. For example, when first route information for driving to a destination is set, and when an external event that occurs in the first route information is detected, the processor 870 can output guidance information related to the external event based on the internal situation of the vehicle.

Thereafter, if the internal situation of the vehicle is maintained as is even after the guidance information is output, the processor 870 can switch the set first route information to second route information not to pass through the point where the external event has occurred. Here, if the internal situation of the vehicle is that an object is placed, without being fixed, in a space (e.g., dashboard) within the vehicle, maintaining the internal situation of the vehicle as is refers to that the object continues to be left in the space, without being put away.

That is, the second route information refers to route information in which the vehicle may reach the destination using another road, without passing through the point where the external event has occurred. In addition, before the vehicle starts, the guidance information related to the external event is output based on the external event and the internal situation of the vehicle, and thereafter, the vehicle may start, while the internal situation of the vehicle is maintained.

In this instance, if the internal situation of the vehicle is maintained even after the guidance information related to the external event is output, the processor 870 can output again the guidance information (guidance information related to the external event) when the vehicle enters a predetermined distance from the point where the external event has occurred.

In this instance, the processor 870 can output the guidance information related to the external event again, rather than changing the route information not to pass through the point. In addition, when the vehicle enters the predetermined distance from the point where the external event (e.g., speed bump) has occurred and the internal situation of the vehicle is changed to correspond to the guidance information related to the external event (e.g., when the user puts a drink in a cup holder), the processor 870 can additionally control the vehicle until the vehicle passes through the point where the external event has occurred.

For example, when the internal situation of the vehicle is changed so as to correspond to the guidance information related to the external event (for example, when the user puts the drink in the cup holder), the processor 870 can additionally control the vehicle such that the changed internal situation of the vehicle is maintained until the vehicle passes through the point where the external event has occurred (e.g., control such that a temperature of the cup holder is equal to a temperature of the drink).

Through this configuration, the present invention provides a vehicle control method capable of changing the route information not to pass through the point where the external event has occurred or re-outputting guidance information in order to prevent an uncomfortable situation inside the vehicle caused by the external event. In addition, when the vehicle 100 detects an external event 1010d (for example, sudden signal change) as illustrated in (a) of FIG. 11, the processor 870 can detect the internal situation of the vehicle.

When an external event is detected, the internal situation of the vehicle is detected as a preset situation (for example, if the driver is asleep in the autonomous driving mode or if the backrest of the driver's seat is laid down at a predetermined angle or greater in the autonomous driving mode as illustrated in (b) of FIG. 11 or a user is present in the infant car seat as illustrated in (b) of FIG. 12, the processor 870 can perform predetermined vehicle controlling.

In addition, if the internal situation of the vehicle is maintained even after the guidance information related to the external event is output, the processor 870 can perform predetermined vehicle controlling. Here, the predetermined vehicle control refers to controlling the vehicle in a predetermined manner. For example, as illustrated in (a) of FIG. 11, the processor 870 can detect an internal situation of the vehicle when an external event 1010d is detected.

The processor 870 can output guidance information related to the external event based on the internal situation of the vehicle. For example, when the internal situation of the vehicle is that the backrest 1100 of the driver's seat is laid at a predetermined angle or greater in the autonomous driving mode, the processor 870 can output guidance information (e.g., the vehicle is decelerated according to a signal) through the output unit.

Here, if the internal situation of the vehicle is a preset situation or if the internal situation of the vehicle is maintained as is even after the guidance information is output, the processor 870 can perform predetermined vehicle controlling. For example, as illustrated in (b) of FIG. 11, when the vehicle is in the autonomous driving mode, the processor 870 can control the vehicle to drive by avoiding the point where the external event has occurred.

Thus, the processor 870 can change the lane so as to avoid the point where the external event has occurred. In addition, when the external event is a moving event, the processor 870 can decelerate the vehicle speed. Here, the processor 870 can reduce the speed of the vehicle, while minimizing deceleration for decelerating the speed of the vehicle, based on the internal situation of the vehicle (for example, decelerating the vehicle with ground friction without operating the brake, etc.).

In addition, if the vehicle cannot avoid the point where the external event has occurred, while driving, the processor 870 can change a driving mode of the vehicle from a normal mode to a comfortable mode to drive the vehicle such that deceleration or acceleration of the vehicle is minimized. In this instance, the processor 870 can vary a suspension strength of the vehicle based on that the vehicle enters the comfortable mode.

Also, as described above, if the internal situation of the vehicle is a preset situation or if the internal situation of the vehicle is maintained as is even after the guidance information is output, the processor 870 can change the route information itself. For example, if the route information is set to pass through the point where the external event has occurred, the processor 870 can reset the route information such that the vehicle may drive to a second road different from a first road including the point where the external event has occurred.

That is, if the internal situation of the vehicle is a preset situation or if the internal situation of the vehicle is maintained as is even after the guidance information is output, the processor 870 can set bypassing route information not to pass through the point where the external event has occurred.

As illustrated in (a) of FIG. 12, when an external event (for example, a speed bump, a vehicle accident, a construction point, a rough road, or the like) is detected, the processor 870 can detect an internal situation of the vehicle through the sensing unit 820. As illustrated in (b) of FIG. 12, when the internal situation of the vehicle is a predetermined situation (for example, when the user (infant) is boarded on the infant car seat or when the user is sleeping in the infant car seat, etc.), the processor 870 can output guidance information related to the external event based on the internal situation of the vehicle.

In addition, if the external event is a bumpy road (or the speed bump 1010b) and the internal situation of the vehicle is the predetermined situation, the processor 870 can change the lane so that the vehicle can run on a flat road. In addition, if the external event is a noisy road (for example, a construction point 1010c or an ambulance approaches) and the internal situation of the vehicle is the predetermined situation, the processor 870 can propose the driver that route information is changed to the second road different from the first road including the point where the external event has occurred, through the output unit 830.

Here, if the route information is not changed, the processor 870 can perform predetermined vehicle controlling (for example, closing the window to minimize noise, maintaining a vehicle temperature, and outputting music for a predetermined time until the vehicle passes through the point where the external event has occurred). In addition, when the vehicle passes through the point where the external event has occurred, the processor 870 can output guidance information related to the internal situation of the vehicle through the output unit.

For example, if the external event is a speed bump and the internal situation of the vehicle is a situation that the driver is holding a drink, the processor 870 can provide guidance information related to the external event (For example, "there is a speed bump, you may put the drink down") before the vehicle passes through the point where the external event has occurred.

Thereafter, when the vehicle passes through the point where the external event has occurred, the processor 870 can output the guidance information related to the internal situation of the vehicle through the output unit 830. For example, the guidance information related to the internal situation of the vehicle may include contents different from the guidance information related to the external event.

If the guidance information related to the external event was "there is a speed bump, you may put the drink down", the guidance information related to the internal situation of the vehicle can be "You may enjoy the drink because the speed bump has passed".

That is, the processor 870 can output guidance information related to an external event informing about what has occurred in the vehicle based on the detected external event and the internal situation of the vehicle, and when the vehicle passes through the point where the external event has occurred, the processor 870 can output guidance information related to the internal situation of the vehicle different to the guidance information related to the external event.

In addition, the processor 870 can sense the internal situation of the vehicle through the sensing unit 820, while the vehicle is driving. Thereafter, the processor 870 can determine a type of the external event to output the guidance information based on the detected internal situation of the vehicle.

That is, when the same internal situation of the vehicle is detected, the processor 870 can determine an external event to output the guidance information among the external events detected during the running of the vehicle. For example, the processor 870 can determine whether a first type of external event (or a first external event, or a second type of external event, for example, a speed bump) is detected in the same internal situation of the vehicle (for example, in a situation in which an object is placed in a space inside the vehicle), the processor 870 can output guidance information related to the first type of external event. Here, the first type of external event can be an external event for changing the internal situation of the vehicle.

In addition, when the second type of external event (or the second external event) (for example, the construction point) different from the first type is detected in the same internal situation of the vehicle, the processor 870 may not output guidance information related to the second type of external event. The second type of external event can be an external event that does not change the internal situation of the vehicle.

Also, when the external event is detected, the processor 870 can maintain execution of a first type of function, among currently executed functions, based on the internal situation of the vehicle and terminate a second type of function different from the first type. For example, the processor 870 can be performing various functions while the vehicle is running. For example, the various functions may include various functions such as an advanced driver assist system (ADAS) function, a music playback function, a vehicle indoor environment maintaining function, and the like.

In this state, when an external event is detected, the processor 870 can maintain execution of the first type of function, among the currently executed functions, based on the internal situation of the vehicle, or terminate (or temporarily stop) execution of the second type of function different from the first type. For example, if it is determined that an external event is detected and that the internal situation of the vehicle will be changed by the external event, the processor 870 can maintain execution of the first type of function (e.g., execution of the vehicle indoor environment maintaining function), among the currently executed functions, and terminate execution of the second type of function (e.g., music playback function) different from the first type.

Here, the first type of function can be a function not related to changing the internal situation of the vehicle, and the second type of function can be a function related to changing the internal situation of the vehicle. Based on the detected type of the external event (or based on whether a running state of the vehicle is changed by the external event), the processor 870 can maintain execution of the first type of function, among the currently executed functions and terminate (or temporarily stop) execution of the second type of function different from the first type.

Also, when it is detected by the sensing unit 820 that the driver grips a steering wheel with one hand and a preset event (e.g., a speed bump or a curved section), among the external events, is detected, the processor 870 can output guidance information indicating that the driver should grip the steering wheel with both hands through at least one of the output unit 830 and the steering wheel. Here, outputting the guidance information through the steering wheel can be outputting vibration having a specific pattern to the steering wheel.

In addition, although the same external event is detected, the processor 870 can determine whether to output guidance information related to the external event, based on whether the driving mode of the vehicle is a manual driving mode or an autonomous driving mode. For example, when the same external event is detected while the driving mode of the vehicle is a manual driving mode, the processor 870 can output guidance information related to the external event based on the internal situation of the vehicle (for example, when at least one of the vehicle occupants is sleeping).

In another example, when the same external event is detected while the driving mode of the vehicle is the autonomous driving mode, the processor 870 may not output guidance information related to the external event based on the internal situation of the vehicle. Further, the processor 870 can control the vehicle in a predetermined manner (for example, avoid running or changing route information, etc.) based on detection of the same external event.

In addition, the present invention may provide a user interface that may inform the driver about an external event that occurs from outside the vehicle in various manners. FIGS. 13-17 are conceptual views illustrating a method of outputting guidance information for various situations according to an embodiment of the present invention.

The processor 870 of the present invention can control a risk guidance level differently according to a running speed of the vehicle. For example, as illustrated in (a) of FIG. 13, when the vehicle is running at a first speed (for example, 100 km/h or higher), the driver's viewing angle may be about a first viewing angle (e.g., 40°), and when the vehicle is running at a second speed (for example, 40 to 90 km/h) lower than the first speed, the driver's viewing angle may be about a second viewing angle (e.g., 65°) greater than the first viewing angle.

When the vehicle is running at a third speed (e.g., 40 km/h or lower) lower than the second speed, the driver's viewing angle may be about a third viewing angle (e.g., 100 to 120°) greater than the second viewing angle. That is, as illustrated in (a) of FIG. 13, as the vehicle speed increases, the viewing angle of the driver is narrowed, and as the vehicle speed decreases, the viewing angle of the driver is widened.

The processor 870 can output notification information related to an external event that exists outside the viewing angle through the output unit based on a speed of the vehicle. For example, when the vehicle is running at the first speed, although the driver is watching an area A corresponding to the first viewing angle, the processor 870 can output guidance information related to an external event (e.g., an accident risk object such as a person, a bicycle, a motorcycle, another vehicle, etc.) that occurs in an area B or C outside the area A.

In another example, when the vehicle is running at the second speed, although the driver is watching the area B (including the area A) corresponding to the second viewing angle, the processor 870 can output guidance information related to an external event that occurs in the area C outside the area B.

When the vehicle is running at the third speed, if the driver is looking at the area C (including the areas B and C) corresponding to the third viewing angle, the processor 870 can output guidance information related to the external event that occurs in an area outside the area C, can output a graphic object formed to identify an external event that occurs in the area C on the windshield, or may not output the guidance information. In addition, the processor 870 can output guidance information related to an external event that occurs in a blind spot of the vehicle when the vehicle is running at the third speed.

Figure 14:
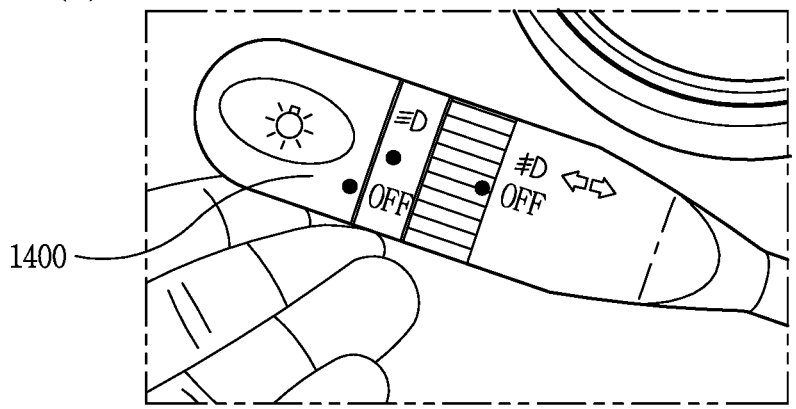
Figure 14:
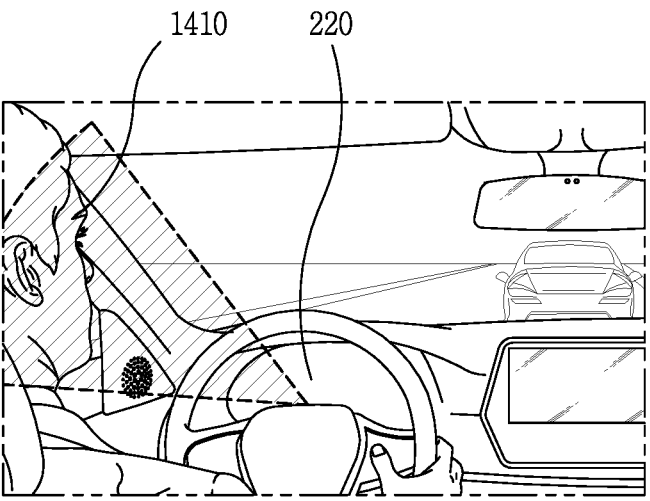
Figure 14:
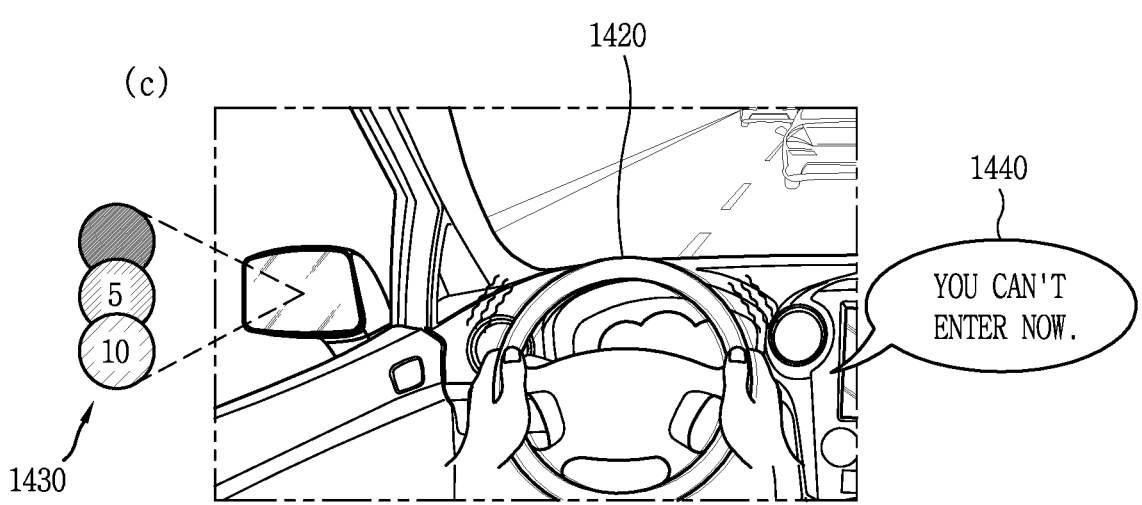

FIG. 14 illustrates a situation in which the driver wants to change lanes. When the driver attempts to change lanes, an external event caused by another vehicle in the next lane may occur. First, as illustrated in (a) and (b) of FIG. 14, the processor 870 can detect the driver's intention to change lands based on the driver's operation 1400 to turn on a turn signal of the vehicle or a change in the driver's eyes 1410.

For example, as illustrated in (b) of FIG. 14, the sensing unit 820 may include an internal camera 220 configured to photograph the driver. The processor 870 can sense the driver's gaze and determine a change in the driver's eyes based on an image received through the internal camera 220.

When the driver's gaze is changed in a section in which lanes are required to be changed according to preset route information, the processor 870 can sense the driver's intention to change lanes. The processor 870 can sense information related to a lane to change (or to enter) through the sensing unit 820. For example, the information related to the lane may include a distance between the own vehicle and another vehicle running in the lane, a relative speed between the own vehicle and the other vehicle, and the like.

Further, the processor 870 can receive information (or V2V information) related to the lane from the other vehicle in the lane to change (or to enter) through the communication unit 810. The processor 870 can output guidance information related to the lane change in various manners based on the information related to the lane. For example, referring to (c) of FIG. 14, the processor 870 can output a sound 1440 indicating a time for lane change via the audio output unit.

In another example, the processor 870 can output vibration at the time when the lane change can be performed, or output vibration at the time when the lane change should not be performed through the haptic output unit. Whether to output vibration at a point in time when the lane change can be performed or at a point in time when the lane change should not be performed can be set at the time of manufacturing the vehicle or can be changed by user setting.

The vibration can be output to the steering wheel 1420, for example. In addition, the processor 870 can output countdown information 1430 indicating a time of entry through the display unit. In addition, screen information corresponding to a screen seen on the side mirror can be output on the display unit. For example, the screen information can be an image received through a camera provided in the side mirror.

The countdown information can be output on the screen information. Also, the countdown information 1430 can be output on the side mirror. In addition, the present invention provides a vehicle control method for preventing an accident when an external event occurs while the driver is not looking ahead.

Figure 15:
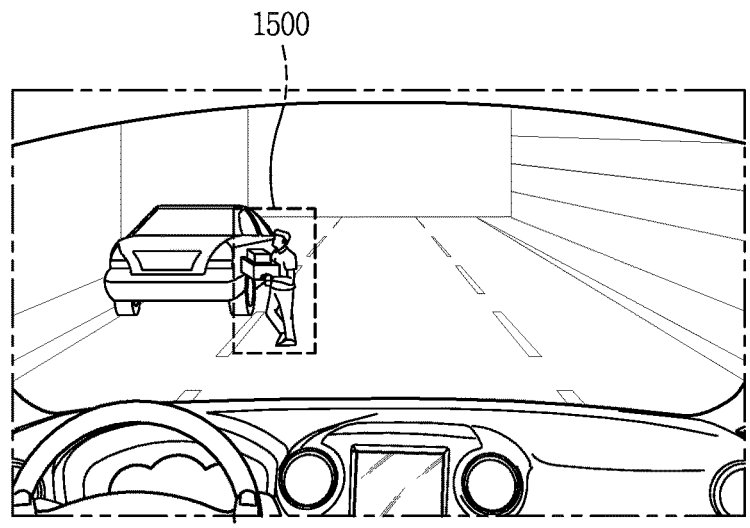

Referring to FIG. 15, the processor 870 can sense an external event that occurs in the vicinity of the vehicle through the sensing unit 820, and may measure a risk due to each external event. In addition, when an external event occurs, the processor 870 can determine an internal situation of the vehicle. In this instance, the processor 870 can sense a situation in which the driver is not looking forward, such as using a mobile terminal, manipulating a CID, or conversing with a passenger.

When the driver does not look ahead, if an external event that may cause a change in a running state of the vehicle occurs, the processor 870 can perform predetermined vehicle controlling and output guidance information related to the external event. For example, when the external event signal is a stop signal, the processor 870 performs predetermined vehicle controlling (e.g., deceleration) and generate vibration on the steering wheel or seat or output a warning horn through the audio output unit.

Thereafter if the internal situation of the vehicle (the state in which the driver does not look ahead) is maintained even after the guidance information related to the external event is output, the processor 870 can stop the vehicle. In another example, when the external event is a start signal, the processor 870 can output notification information indicating that the vehicle should be started through the output unit 830, based on the fact that the driver is not looking ahead.

In addition, if an external event which occurs when the driver is not looking ahead is a sudden obstacle (e.g., a pedestrian or a bicycle, etc.) 1500 that appears in front of the vehicle, the processor 870 can output information related to the external event through the output unit and output a horn (klaxon) to warn the obstacle. Through such a configuration, the present invention provides a user interface capable of preventing an accident with respect to various external events.

Figure 16:
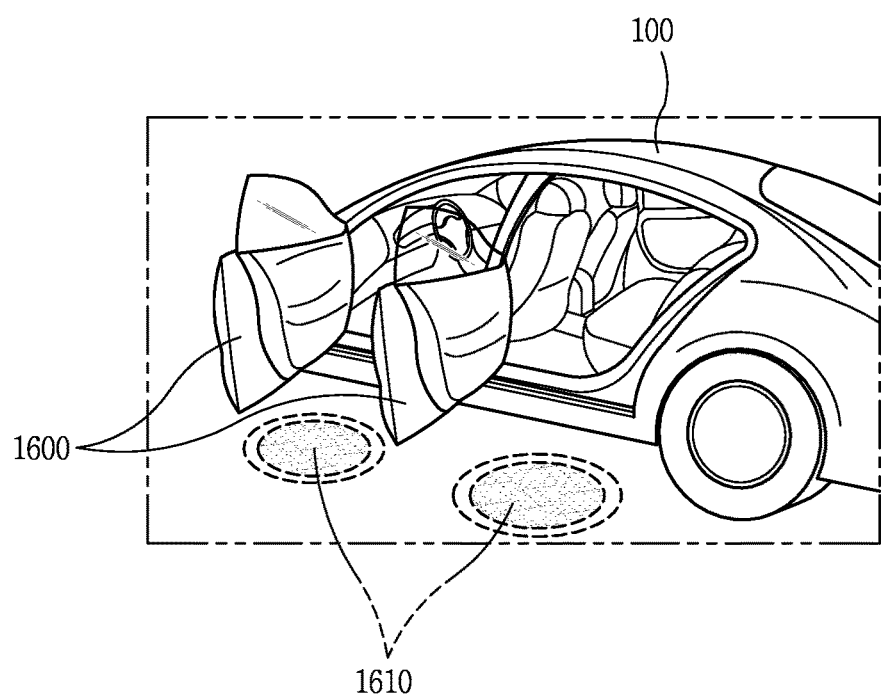
Figure 17:
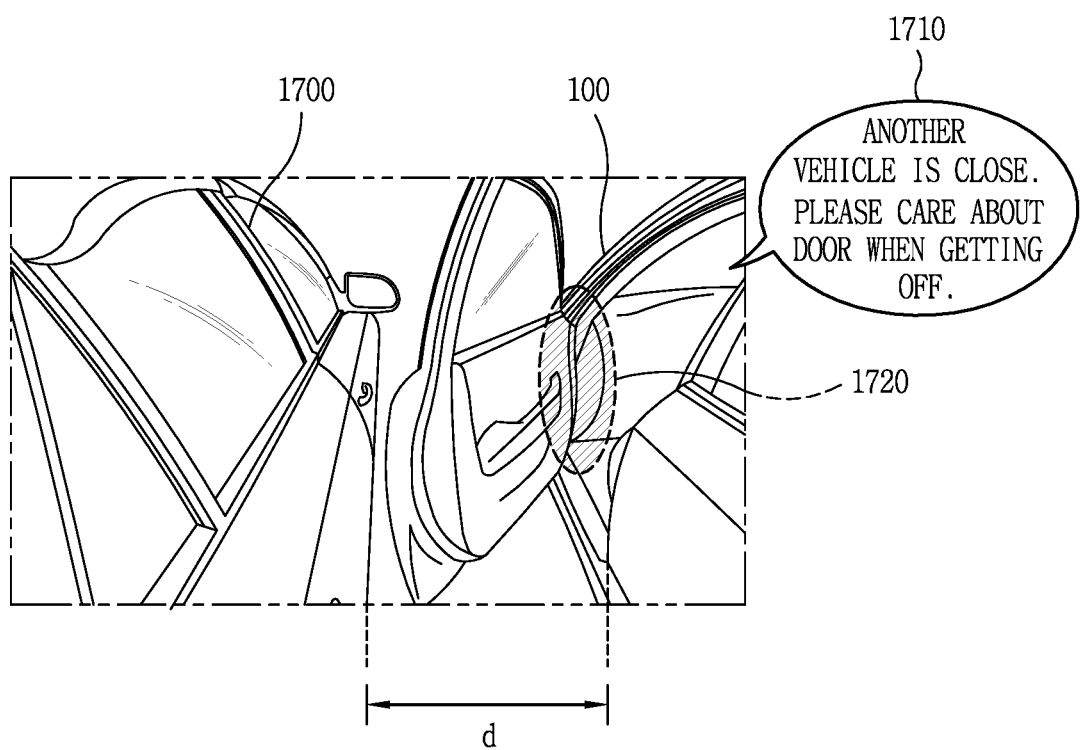

In addition, the present invention provides a vehicle control method capable of preventing an accident that may occur when running of the vehicle is completed and the driver is about to get out. Referring to FIG. 16, when the vehicle is parked, the processor 870 can sense whether the user present in the vehicle is about to get out.

For example, the processor 870 can sense, through the sensing unit 820, that the occupant is about to get out. The processor 870 can sense that the occupant is about to get out when the door handle of the vehicle is pulled, when the occupant leans his body toward the door in a stationary state, or when a voice of the driver asking the occupant to get out is sensed.

In addition, the processor 870 can sense an external event that occurs at the door 1600 side to which the passenger is to get out through the sensing unit 820. For example, the processor 870 can sense whether a vehicle/bicycle/pedestrian approaches the rear side of the door to which the occupant is about to get out, whether there is another vehicle within a certain distance from the door, whether a ground below the door is in a specific state (e.g., water is present, soil is wet, etc.).

In addition, when it is detected that the occupant is about to get out and an external event occurs at the door to which the occupant is about to get out, the processor 870 can perform a predetermined vehicle operation. For example, the processor 870 can output guidance information related to the external event through the output unit.

In addition, the processor 870 can limit the opening of the door of the vehicle until the external event is over (e.g., strongly controlling strength for opening the door). In addition, when the door is forcibly opened and an opening of the door is restricted, the processor 870 can output a warning sound to the outside to warn the external event (for example, an object approaching the door) or turn on a lamp formed to face the ground on the door 1600 side. In this instance, notification information 1610 generated in the lamp can be irradiated on ground adjacent to the door.

In addition, when another vehicle 1700 exists within a predetermined distance d from the door to which the occupant is about to get out, the processor 870 can output notification information 1710 for preventing the door from colliding with the other vehicle. In addition, the processor 870 can control the vehicle such that the vehicle door does not collide with the other vehicle by varying strength of a hinge 1720 of the vehicle door.

Further, if it is sensed by the sensing unit 820 that the other vehicle is parked within a certain distance from the own vehicle and a door of the other vehicle is opened, the processor 870 can output guidance information indicating that it should pay attention that the door of the other vehicle may not collide with the own vehicle through the output unit.

According to the embodiment of the present invention, one or more effects can be obtained as follows. First, in the present invention, by outputting different guidance information according to the internal state of the vehicle with respect to the same external event, a novel user interface capable of intuitively informing about an action to be taken by the user, rather than simply informing about an external event, can be provided.

Second, in the present invention, by performing preset vehicle controlling according to internal situations of the vehicle with respect to an external event, a novel vehicle control method capable of preventing an action that may cause user inconvenience even when a running state of the vehicle is changed due to the external event can be provided.

The vehicle control device 800 described above can be included in the vehicle 100. The operation or control method of the vehicle control device 800 described above can be inferred and applied to the operation or the control method of the vehicle 100 (or the controller 170) in the same or similar manner.

For example, the control method of the vehicle 100 (or the control method of the vehicle control device 800) includes detecting an external event that occurs outside the vehicle, detecting an internal situation of the vehicle, and outputting different guidance information related to the detected external event based on the detected internal situation of the vehicle. A more specific embodiment can be replaced with the above-described contents, or can be inferred or applied in the same or similar manner.

Each of the above steps can be performed by the controller 170 provided in the vehicle 100, as well as the vehicle control device 800. Further, all the functions, configurations, or control methods performed by the vehicle control device 800 described above can be performed by the control unit 170 provided in the vehicle 100. That is, all the control methods described in this disclosure can be applied to a control method of a vehicle or a control method of a control device.

Further, the vehicle control device 800 illustrated above can be a mobile terminal. In this instance, all functions, configurations, or control methods performed by the vehicle control device 800 can be performed by the controller of the mobile terminal. In addition, all the control methods described in this disclosure can be inferred or applied to the control method of the mobile terminal in the same or similar manner.

Specifically, the mobile terminal can be formed as a wearable device (e.g., watch, glass, etc.) as well as a smartphone. Further, the mobile terminal can be connected to perform communication with the vehicle control device through the communication unit.

The mobile terminal can transmit and receive all kinds of screen information, signals related to vehicle control, and user input signals described in the present disclosure through the communication unit. In addition, the mobile terminal can receive all kinds of screen information described in the present disclosure through the communication unit and output it to the display unit of the mobile terminal. Further, when a touch (or selection) is performed through the display unit of the mobile terminal, the touched (selected) information can be transmitted to the vehicle control device. The vehicle can be controlled based on the touched information.

Further, when a gear of the vehicle is changed or a running state of the vehicle is changed, the vehicle control device can transmit information related to the gear change of the vehicle or the running state of the vehicle to the mobile terminal through the communication unit. In this instance, screen information related to parking that is output to the mobile terminal can be changed by applying the contents described in this disclosure.

The present invention described above may be implemented as a computer-readable code in a medium in which a program is recorded. The computer-readable medium includes any type of recording device in which data that can be read by a computer system is stored. The computer-readable medium may be, for example, a hard disk drive (HDD), a solid state disk (SSD), a silicon disk drive (SDD), a ROM, a RAM, a CD-ROM, a magnetic tape, a floppy disk, an optical data storage device, and the like. The computer-readable medium also includes implementations in the form of carrier waves (e.g., transmission via the Internet). Also, the computer may include the controller 180 of the terminal. Thus, the foregoing detailed description should not be interpreted limitedly in every aspect and should be considered to be illustrative. The scope of the present invention should be determined by reasonable interpretations of the attached claims and every modification within the equivalent range are included in the scope of the present invention.

The foregoing embodiments and advantages are merely exemplary and are not to be considered as limiting the present disclosure. The present teachings may be readily applied to other types of devices. This description is intended to be illustrative, and not to limit the scope of the claims. Many alternatives, modifications, and variations will be apparent to those skilled in the art. The features, structures, methods, and other characteristics of the exemplary embodiments described herein may be combined in various ways to obtain additional and/or alternative exemplary embodiments.

As the present features may be embodied in several forms without departing from the characteristics thereof, it should also be understood that the above-described embodiments are not limited by any of the details of the foregoing description, unless otherwise specified, but rather should be considered broadly within its scope as defined in the appended claims, and therefore all changes and modifications that fall within the metes and bounds of the claims, or equivalents of such metes and bounds are therefore intended to be embraced by the appended claims.

What is claimed is:

1. A vehicle control device comprising:
    a detector configured to detect an external situation of a vehicle and an internal situation of the vehicle;
    an output unit; and
    a processor configured to:
    control the output unit to output different guidance information regarding the detected external situation based on a type of the detected internal situation,
    in response to the detected external situation of the vehicle corresponding to a first external event, and the detected internal situation of the vehicle corresponding to a first internal event, control the output unit to output first guidance information related to the detected external event, and
    in response to the detected external situation of the vehicle corresponding to the first external event, and the detected internal situation of the vehicle corresponding to a second internal event different than the first internal event, control the output unit to output second guidance information related to the detected external event that is different than the first guidance information.

2. The vehicle control device of claim 1, wherein the detector includes at least one of a wireless communication processor configured to wirelessly receive information about an outside of the vehicle from an external source, and a camera configured to photograph the outside of the vehicle.

3. The vehicle control device of claim 2, wherein the external source includes an external server or another vehicle.

4. The vehicle control device of claim 1, wherein the internal situation of the vehicle includes a state of an object or a state of a user present inside the vehicle, and
    wherein the processor outputs the first guidance information or the second guidance information based on at least one of the state of the object and the state of the user.

5. The vehicle control device of claim 4, wherein when a running state of the vehicle is changed by the first external event and the processor determines the object will drop due to the change in the running state of the vehicle, the processor outputs a first type of notification information.

6. The vehicle control device of claim 5, wherein when the first external event is detected, the processor outputs a second type of notification information different from the first type of notification information based on the state of the user, and
    wherein the second type of notification information is varied based on the state of the user.

7. The vehicle control device of claim 6, wherein the state of the user includes at least one of when the driver holds a drink, when the driver is conversing with a passenger, when the driver is making a call, when the driver is sleeping in an autonomous driving mode, when a backrest of the driver's seat is laid down by more than a certain angle in the autonomous driving mode, when the driver's seat is rotated with respect to a front of the vehicle in the autonomous driving mode, and when a child is in an infant car seat.

8. The vehicle control device of claim 1, wherein when route information is set before the vehicle starts running, the processor determines an external event which occurs on a route to which the vehicle is to be driven based on the route information, and outputs guidance information related to the external event through the output unit before the vehicle starts running.

9. The vehicle control device of claim 8, wherein when the internal situation of the vehicle is maintained even after the guidance information related to the external event is output, the processor changes the set route information not to pass through a point where the external event has occurred.

10. The vehicle control device of claim 8, wherein when the internal situation of the vehicle is maintained even after the guidance information related to the external event is output, the processor outputs again the guidance information when the vehicle enters a predetermined distance from a point where the external event has occurred.

11. The vehicle control device of claim 8, wherein when the internal situation of the vehicle is maintained even after the first guidance information or the second guidance information related to the external event is output, the processor controls the vehicle in a predetermined manner.

12. The vehicle control device of claim 11, wherein when the vehicle is in the autonomous driving mode, the processor controls the vehicle to operate by avoiding a point where the external event has occurred.

13. The vehicle control device of claim 11, wherein when the route information is set to pass through a point where the external event has occurred, the processor resets the route information such that the vehicle drives to a second road different from a first road including the point where the external event has occurred.

14. The vehicle control device of claim 1, wherein the processor outputs the first guidance information or the second guidance information when the vehicle passes through a point where the first external event has occurred.

15. The vehicle control device of claim 1, wherein the processor determines a type of the first external event to output the first guidance information or the second guidance information based on the detected internal situation of the vehicle.

16. The vehicle control device of claim 1, wherein when the first external event is detected, the processor maintains execution of a first type of function, among currently executed functions, based on the internal situation of the vehicle and terminates a second type of function different from the first type of function.

17. The vehicle control device of claim 1, wherein when the detector detects that a driver grips a steering wheel with one hand and a preset external event, the processor outputs guidance information indicating that the driver should grip the steering wheel with both hands through the output unit and the steering wheel.

18. A vehicle comprising the vehicle control device described in claim 1.

19. A method of controlling a vehicle including an output unit, the method comprising:
  detecting, via a detector, an external situation of a vehicle and an internal situation of the vehicle;
  outputting different guidance information regarding the detected external situation based on a type of the detected internal situation;
  in response to the detected external situation of the vehicle corresponding to a first external event, and the detected internal situation of the vehicle corresponding to a first internal event, controlling, via a processor, the output unit to output first guidance information related to the detected external event; and
  in response to the detected external situation of the vehicle corresponding to the first external event, and the detected internal situation of the vehicle corresponding to a second internal event different than the first internal event, controlling, via the processor, the output unit to output second guidance information related to the detected external event that is different than the first guidance information.

20. The method of claim 19, wherein the internal situation of the vehicle includes a state of an object or a state of a user present inside the vehicle, and
  wherein the first guidance information or the second guidance information is output based on at least one of the state of the object and the state of the user.

* * * * *